United States Patent
Suzuki et al.

(10) Patent No.: US 10,773,714 B2
(45) Date of Patent: Sep. 15, 2020

(54) PARKING CONTROL METHOD AND PARKING CONTROL APPARATUS

(71) Applicant: Nissan Motor Co., Ltd., Yokohama-shi, Kanagawa (JP)

(72) Inventors: Yasuhiro Suzuki, Kanagawa (JP); Yasuhisa Hayakawa, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/615,624

(22) PCT Filed: May 25, 2017

(86) PCT No.: PCT/JP2017/019630
§ 371 (c)(1),
(2) Date: Nov. 21, 2019

(87) PCT Pub. No.: WO2018/216184
PCT Pub. Date: Nov. 29, 2018

(65) Prior Publication Data
US 2020/0079361 A1    Mar. 12, 2020

(51) Int. Cl.
*B60W 30/06* (2006.01)
*B60W 40/02* (2006.01)
*B60W 40/105* (2012.01)
*G05D 1/00* (2006.01)
*G05D 1/02* (2020.01)
*G06K 9/00* (2006.01)

(52) U.S. Cl.
CPC ............ *B60W 30/06* (2013.01); *B60W 40/02* (2013.01); *B60W 40/105* (2013.01); *G05D 1/0033* (2013.01); *G05D 1/0223* (2013.01); *B60W 2540/18* (2013.01); *B60W 2554/00* (2020.02); *G05D 2201/0213* (2013.01); *G06K 9/00805* (2013.01)

(58) Field of Classification Search
None
See application file for complete search history.

(56) References Cited

U.S. PATENT DOCUMENTS

| 2017/0032680 A1 | 2/2017 | Imai et al. |
| 2018/0037262 A1 | 2/2018 | Imai |
| 2018/0259956 A1 | 9/2018 | Kawamoto |

FOREIGN PATENT DOCUMENTS

| JP | 2007-295033 A | 11/2007 |
| JP | 2008-074296 A | 4/2008 |

(Continued)

*Primary Examiner* — Alan D Hutchinson
*Assistant Examiner* — Andy Schneider
(74) *Attorney, Agent, or Firm* — Young Basile Hanlon & MacFarlane, P.C.

(57) ABSTRACT

A parking control method includes acquiring an operation command from an operator outside a vehicle, detecting the position of an operation terminal, detecting the position of an obstacle, calculating a first area observable from the operator and a second area other than the first area and unobservable from the operator on the basis of the positional relationship between the position of the obstacle and the position of the operator, calculating a parking route and a control instruction for moving along the parking route such that a first proximity level of the vehicle to the obstacle in the first area is higher than a second proximity level of the vehicle to the obstacle in the second area, and parking the vehicle in accordance with the control instruction.

18 Claims, 48 Drawing Sheets

(56) References Cited

FOREIGN PATENT DOCUMENTS

| | | |
|---|---|---|
| JP | 2008-174192 A | 7/2008 |
| JP | 2010-018167 A | 1/2010 |
| JP | 2016-185745 A | 10/2016 |
| JP | 2017-030481 A | 2/2017 |
| WO | 2017/057060 A1 | 4/2017 |
| WO | 2017/068698 A1 | 4/2017 |

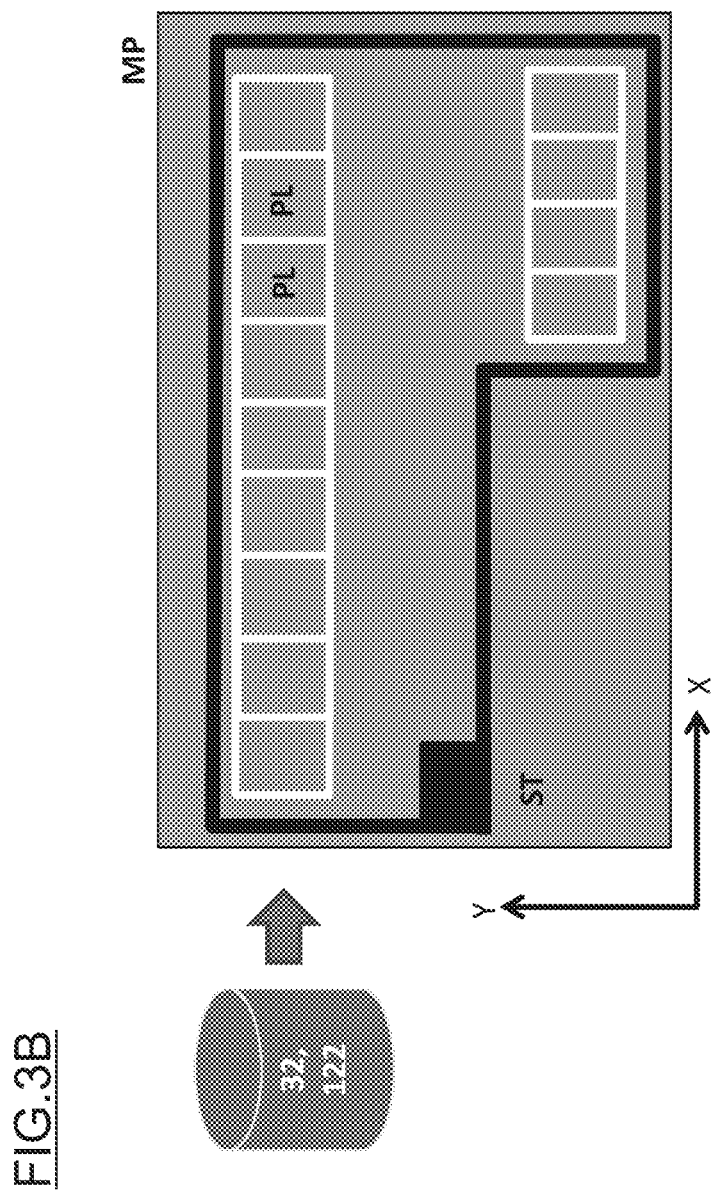

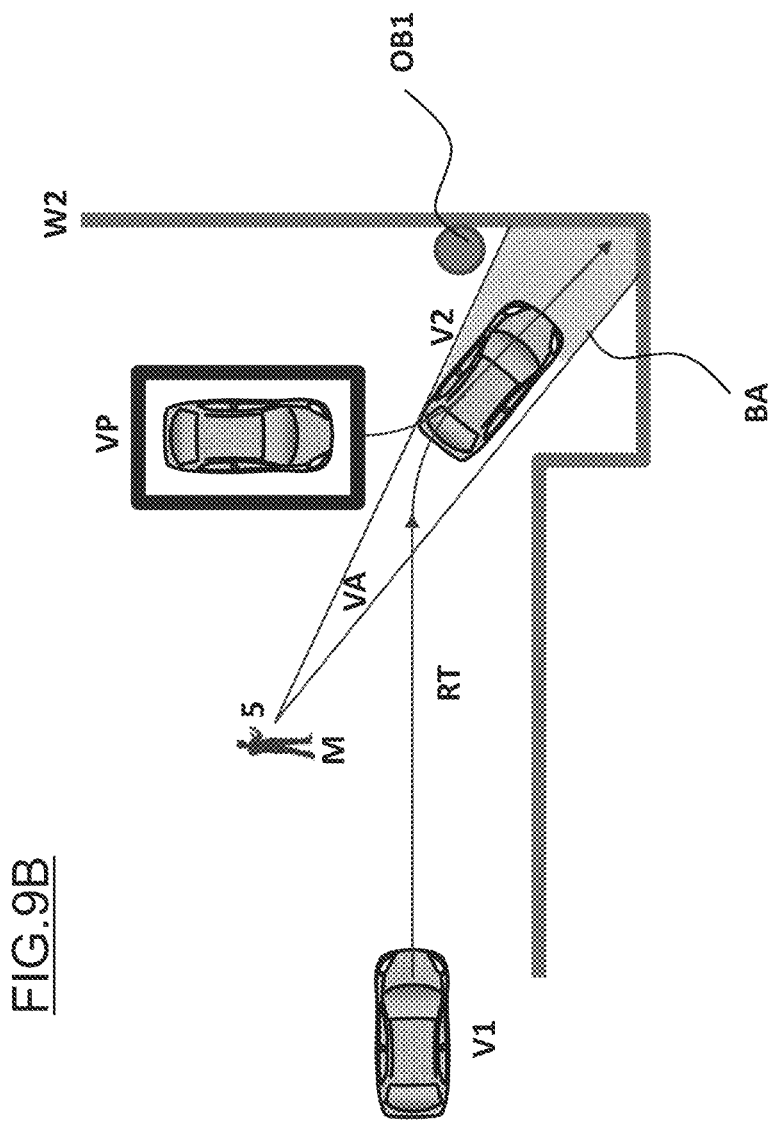

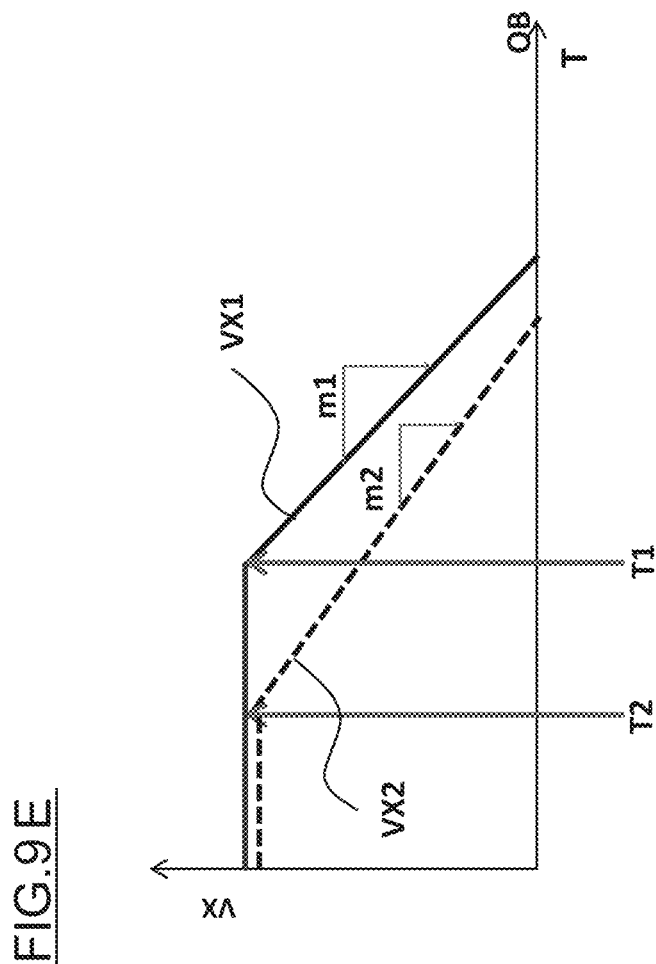

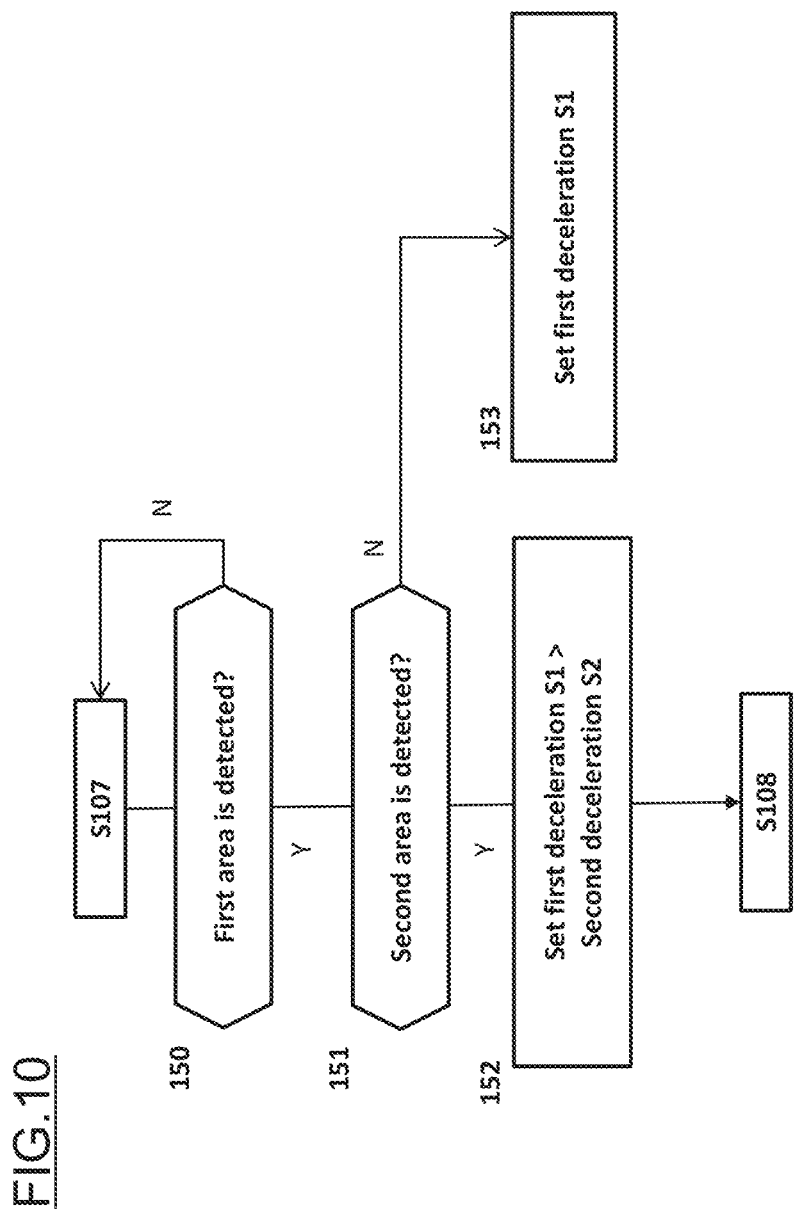

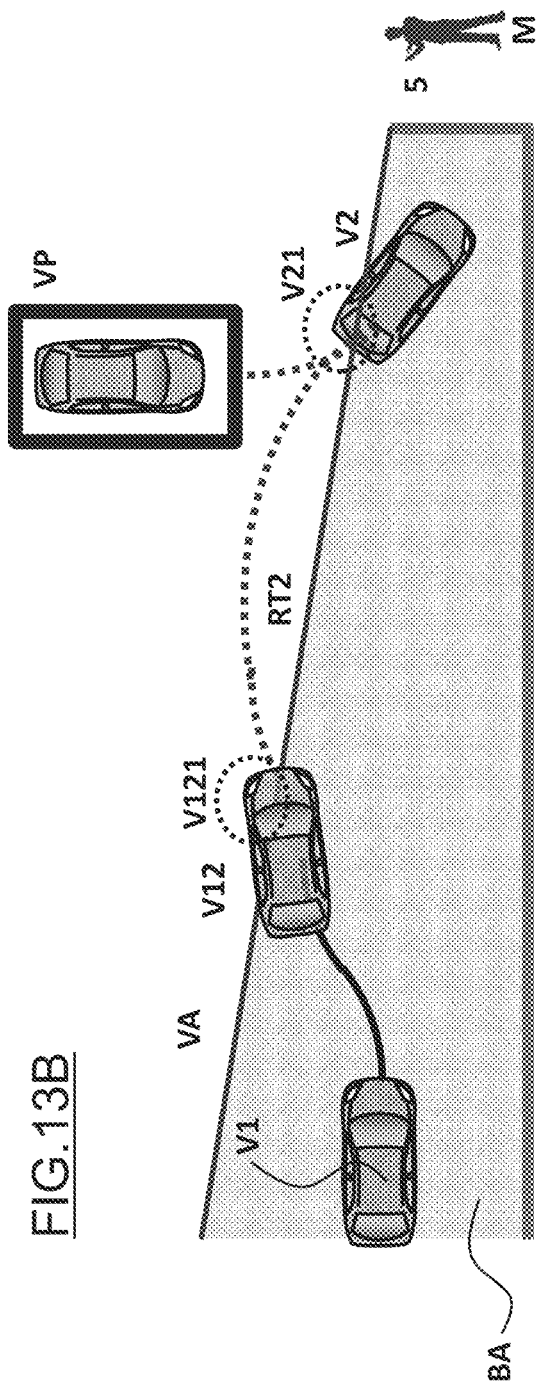

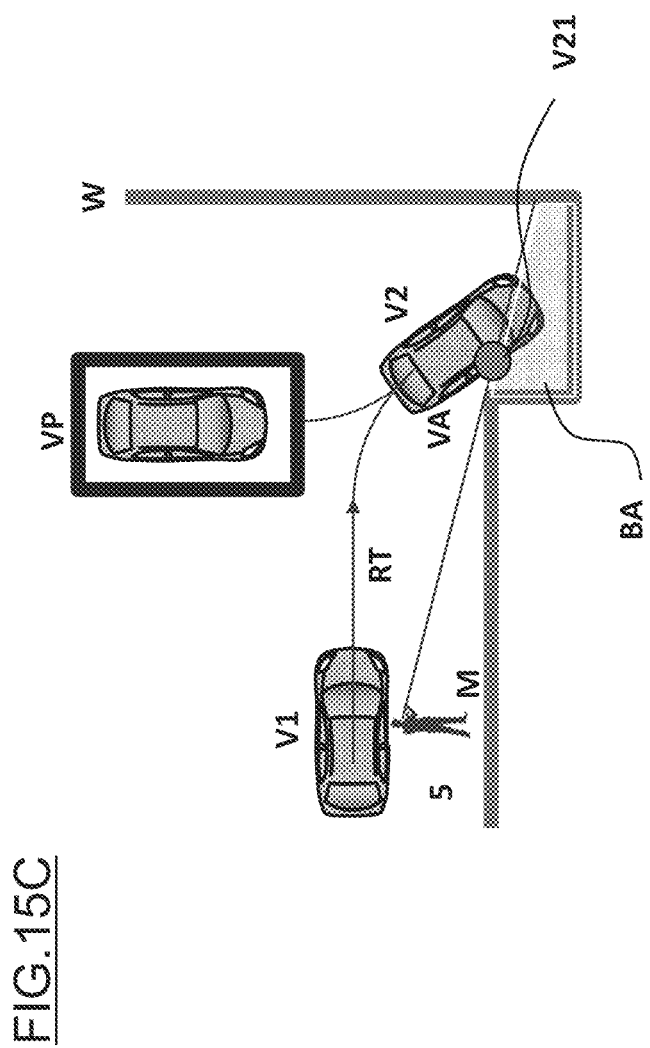

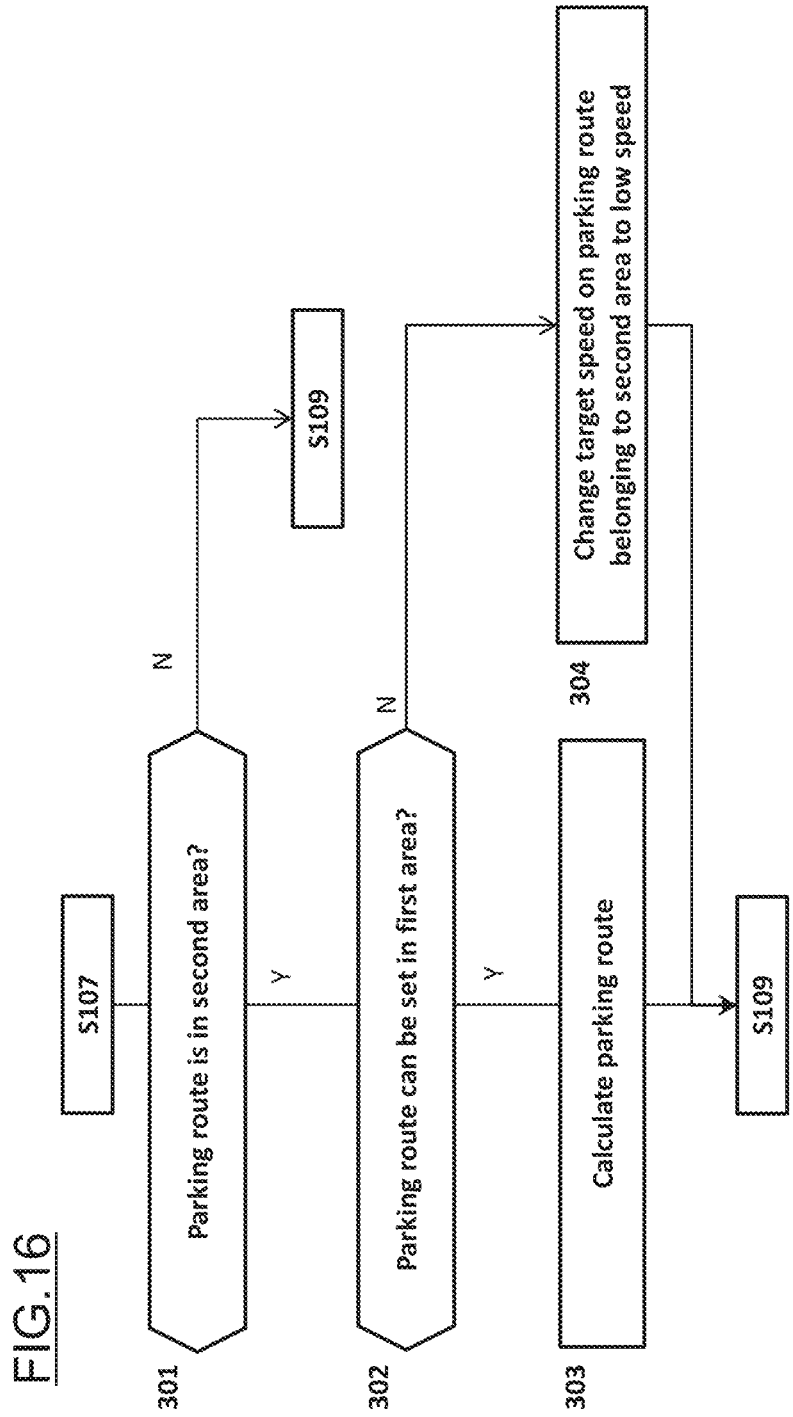

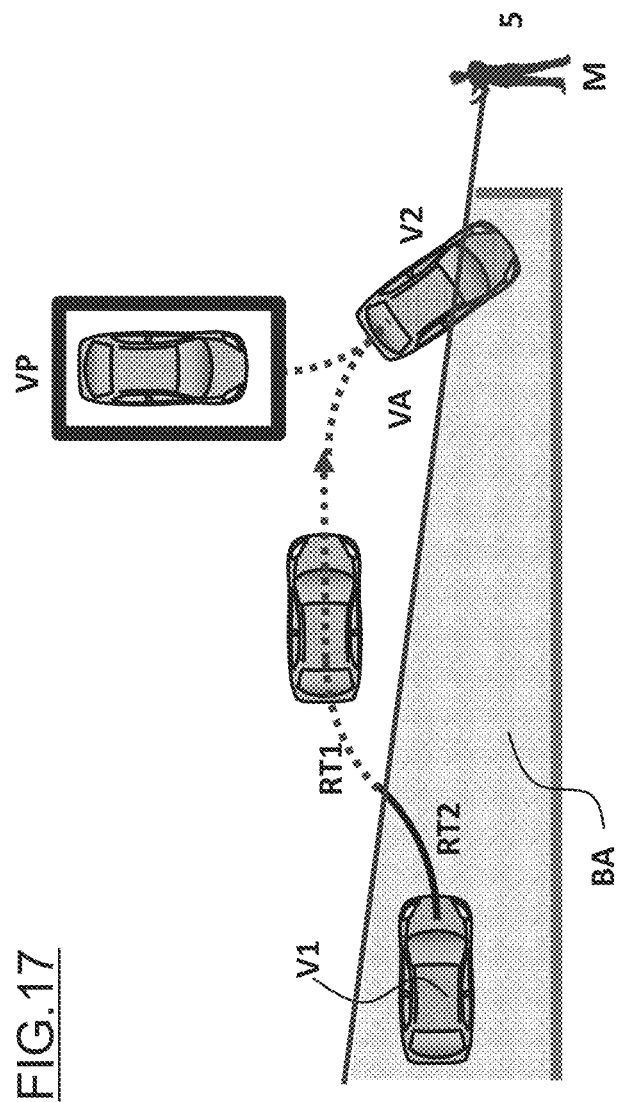

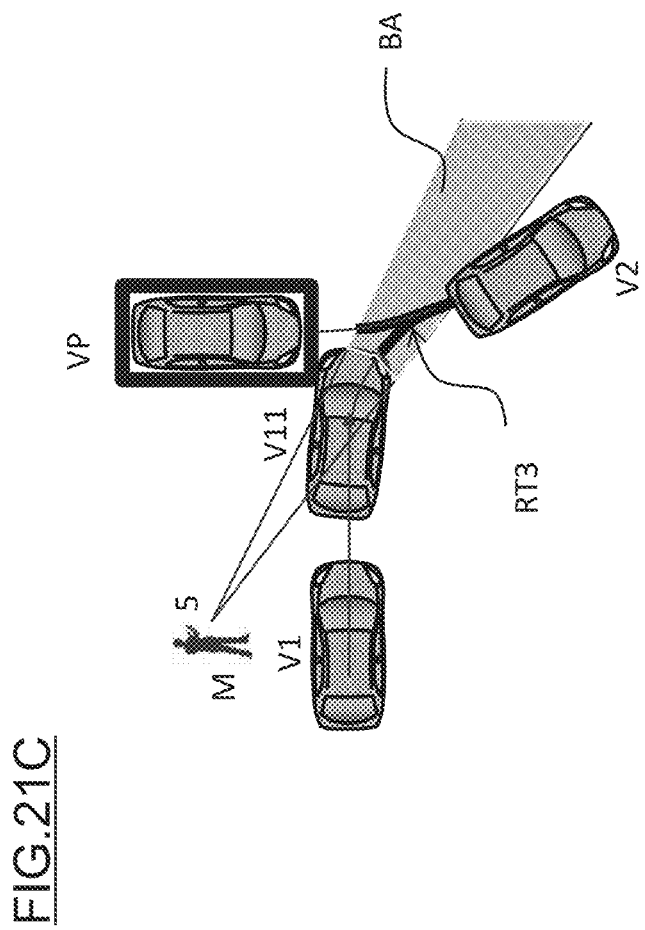

10,773,714 B2

PARKING CONTROL METHOD AND PARKING CONTROL APPARATUS

TECHNICAL FIELD

The present invention relates to a parking control method and a parking control apparatus.

BACKGROUND

A parking assistance technique for controlling a vehicle to make a stop when detecting an obstacle is known (JP2008-74296A).

SUMMARY

In the above prior art, however, when an obstacle is detected, the vehicle is controlled to make a stop without exception even in a situation in which the vehicle can continue to move.

A problem to be solved by the present invention is to allow the vehicle to continue to move in accordance with a situation when an obstacle is detected.

The present invention solves the above problem through calculating a first area observable from an operator outside a vehicle and a second area unobservable from the operator and calculating a parking route such that a first proximity level of the vehicle to the obstacle in the first area is higher than a second proximity level of the vehicle to the obstacle in the second area.

According to the present invention, parking control can be continued in the first area observable from the operator even when an obstacle exists.

BRIEF DESCRIPTION OF THE DRAWINGS

FIG. 3B is a diagram for describing a second detection scheme for an obstacle;

FIG. 9B is a second diagram for describing a setting scheme for the deceleration start timing;

FIG. 9E is a fifth diagram for describing a setting scheme for the deceleration start timing;

FIG. 10 is a flowchart illustrating a setting scheme for deceleration;

FIG. 13B is a second diagram for describing the first example of the calculation scheme for a parking route;

FIG. 15C is a third diagram for describing the second example of the calculation scheme for a parking route;

FIG. 16 is a flowchart illustrating a third example of a calculation scheme for a parking route;

FIG. 17 is a diagram for describing the third example of the calculation scheme for a parking route;

FIG. 21C is a third diagram for describing the fifth example of the calculation scheme for a parking route;

DETAILED DESCRIPTION

Hereinafter, one or more embodiments of the present invention will be described with reference to the drawings.

In the embodiments, the present invention will be described by exemplifying a case in which the parking control apparatus according to the present invention is applied to a parking control system. The parking control apparatus may also be applied to a portable operation terminal (equipment such as a smartphone or a personal digital assistant (PDA)) capable of exchanging information with an onboard apparatus. The parking control method according to the present invention can be used in the parking control apparatus, which will be described below.

Figure 1:
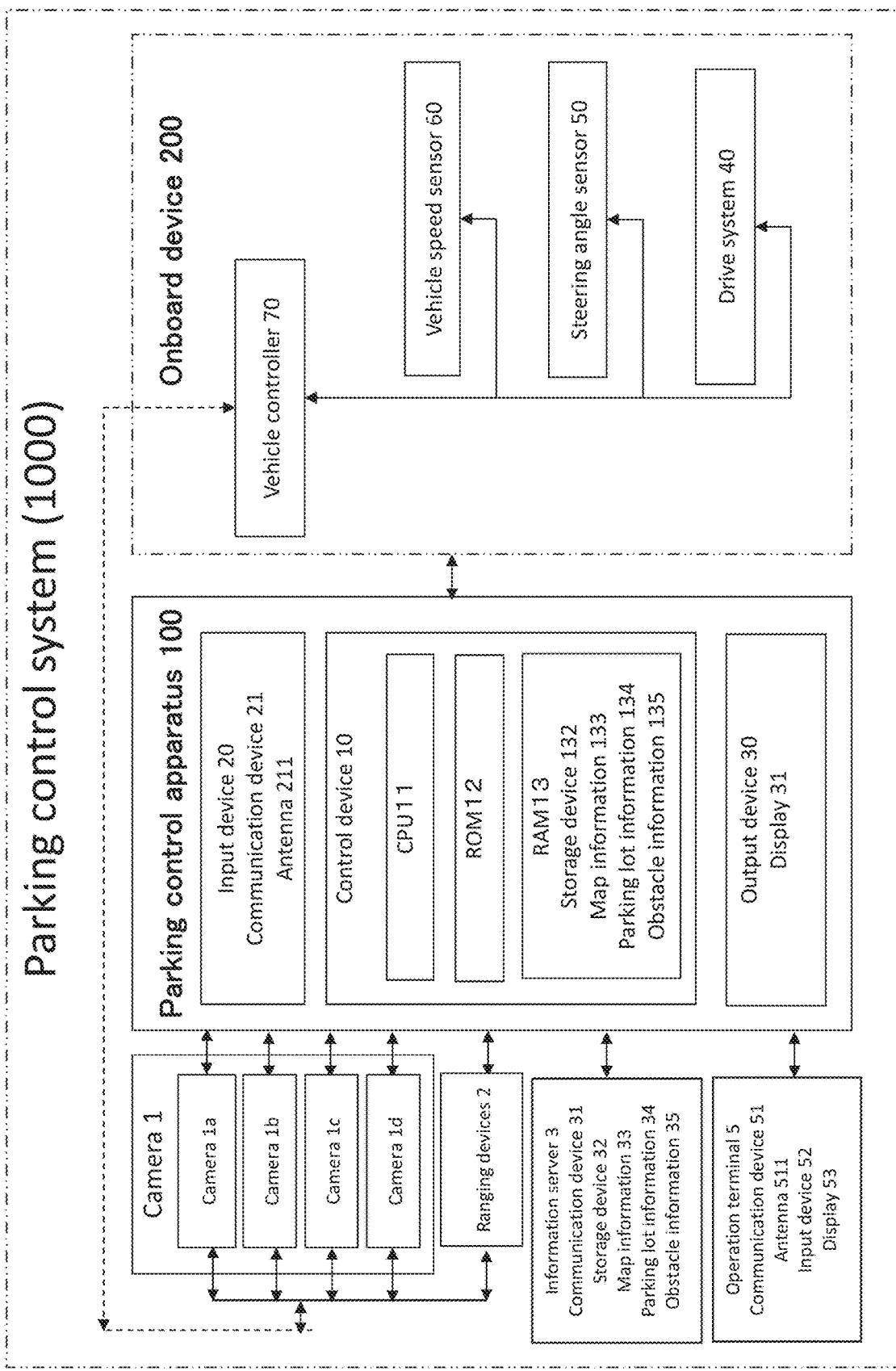
FIG. 1 is a block diagram illustrating an example of a parking control system according to one or more embodiments of the present invention.

FIG. 1 is a block diagram of a parking control system 1000 including a parking control apparatus 100 according to one or more embodiments of the present invention. The parking control system 1000 according to one or more embodiments of the present invention includes cameras 1a to 1d, multiple ranging devices 2, an information server 3, an operation terminal 5, the parking control apparatus 100, a vehicle controller 70, a drive system 40, a steering angle sensor 50, and a vehicle speed sensor 60. The parking control apparatus 100 according to one or more embodiments of the present invention controls an operation of moving (parking) the vehicle into a parking space on the basis of an operation command that is input from the operation terminal 5.

The operation terminal 5 is a portable computer that can be brought out to outside of the vehicle and has an input function and a communication function. The operation terminal 5 receives an input of an operator's operation command for controlling the driving (operation) of the vehicle for parking. The driving includes operations for parking (operations for entering a parking space and exiting the parking space). The operator inputs instructions via the operation terminal 5. The instructions include an operation command for execution of parking. The operation command includes execution/stop of parking control, selection/change of a target parking space, selection/change of a parking route, and other information necessary for parking. The operator can also make the parking control apparatus 100 recognize the instructions including the operation command without using the operation terminal 5, such as by a gesture of the operator.

The operation terminal 5 includes a communication device and is capable of exchanging information with the parking control apparatus 100 and the information server 3. The operation terminal 5 transmits the operation command, which is input outside the vehicle, to the parking control apparatus 100 via a communication network and inputs the operation command to the parking control apparatus 100. The operation terminal 5 communicates with the parking control apparatus 100 using signals including a unique identification code.

The operation terminal 5 includes a display 53. The display 53 presents an input interface and various information items. When the display 53 is a touch panel-type display, it has a function of receiving the operation command.

The operation terminal 5 may be a portable device, such as a smartphone or a personal digital assistant (PDA), in which applications are installed for receiving an input of the operation command used in the parking control method according to one or more embodiments of the present invention and transmitting the operation command to the parking control apparatus 100.

The information server 3 is an information providing device provided on a network capable of communication. The information server includes a communication device 31 and a storage device 32. The storage device 32 includes readable map information 33, parking lot information 34, and obstacle information 35. The parking control apparatus 100 and the operation terminal 5 can access the storage device 32 of the information server 3 to acquire each information item.

The parking control apparatus 100 according to one or more embodiments of the present invention includes a control device 10, an input device 20, and an output device 30. These components of the parking control apparatus 100 are connected to one another via a controller area network (CAN) or other onboard LAN to mutually exchange information. The input device 20 includes a communication device 21. The communication device 21 receives the operation command transmitted from the external operation terminal 5 and inputs the operation command to the input device 20. The subject who inputs the operation command to the external operation terminal 5 may be a person (a user, a passenger, a driver, or a worker of a parking facility). The input device 20 transmits the received operation command to the control device 10. The output device 30 includes a display 31. The output device 30 notifies the driver of parking control information. The display 31 according to one or more embodiments of the present invention is a touch panel-type display having an input function and an output function. When the display 31 has an input function, it serves as the input device 20. Even when the vehicle is controlled on the basis of the operation command which is input from the operation terminal 5, an occupant (driver or passenger) can input an operation command, such as a command for emergency stop, via the input device 20.

The control device 10 of the parking control apparatus 100 according to one or more embodiments of the present invention is a specific computer including a ROM 12 that stores a parking control program, a CPU 11 as an operation circuit that executes the program stored in the ROM 12 to serve as the parking control apparatus 100 according to one or more embodiments of the present invention, and a RAM 13 that serves as an accessible storage device.

The parking control program according to one or more embodiments of the present invention is a program for calculating a first area observable from an operator M from the positional relationship between an observation position, which is set on the basis of the position of the operator M, and the position of an obstacle, calculating a parking route and a control instruction for moving along the parking route such that a first proximity level of the vehicle to the obstacle in the first area is higher than a second proximity level of the vehicle to the obstacle in a second area, and executing the parking control for the vehicle in accordance with the control instruction. The parking control program is a program for calculating a parking route and a control instruction for moving along the parking route such that at least a part of the vehicle exists in the first area along at least a part of the parking route of the vehicle, and executing the parking control for the vehicle in accordance with the control instruction. This program is executed by the control device 10 of the parking control apparatus 100 according to one or more embodiments of the present invention. The first area and the second area can be calculated using the detection results of an obstacle, such as the size and shape of the obstacle, in addition to the position of the obstacle.

The parking control apparatus 100 according to one or more embodiments of the present invention is a remote control-type apparatus that receives the operation command from external and controls the movement of the vehicle to park the vehicle into a given parking space. During this operation, the occupant may be present outside the vehicle interior or may also be present inside the vehicle interior.

The parking control apparatus 100 according to one or more embodiments of the present invention may be of an automated or autonomous control type in which the steering operation and the accelerator/brake operation are performed in an automated or autonomous manner. The parking control apparatus 100 may also be of a semiautomated or semiautonomous type in which the steering operation is performed in an automated or autonomous manner while the driver performs the accelerator/brake operation.

In the parking control program according to one or more embodiments of the present invention, the user may arbitrarily select a target parking space, or the parking control apparatus 100 or the parking facility side may automatically set a target parking space.

The control device 10 of the parking control apparatus 100 according to one or more embodiments of the present invention has functions of executing a setting process for the observation position, a calculation process for the first area and/or second area, a calculation process for the parking route, a calculation process for the control instruction, and a parking control process. The control device 10 further has functions of executing an obstacle detection process and calculating the parking route with consideration for the position of the obstacle. Each of the above processes is executed by cooperation of software for implementing the process and the above-described hardware.

The setting process for an observation position will be described with reference to FIGS. 2A to 2D. The control device 10 calculates the observation position on the basis of the position of the operator M. The control device 10 acquires the position of the operator M. The position of the operator M may be detected directly on the basis of the sensor signals from sensors provided in the vehicle V or may also be obtained through detecting the position of the operation terminal 5 carried by the operator M and calculating the position of the operator M on the basis of the position the operation terminal 5. The operation terminal 5 may be provided at a predetermined position or may also be carried by the operator M. When the operation terminal 5 is provided at a predetermined position, the operator M moves to the position at which the operation terminal 5 is provided, and uses the operation terminal 5 there. In these cases, the position of the operation terminal 5 can be employed as the position of the operator M.

Figure 2A:
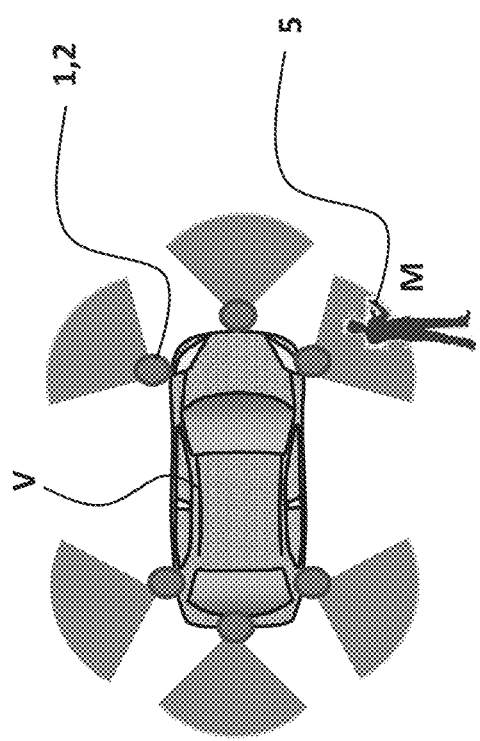
FIG. 2A is a diagram for describing a first detection scheme for the position of an operator.

As illustrated in FIG. 2A, the position of the operator M is detected on the basis of the detection results of the multiple ranging devices 2 provided in the vehicle and/or the images captured by the cameras 1. The position of the operator M can be detected on the basis of the images captured by the cameras 1a to 1d. The ranging devices 2 for use may each be a radar device, such as millimeter-wave radar, laser radar or ultrasonic radar, or sonar. The multiple ranging devices 2 and their detection results can be identified and, therefore, the position of the operator M can be detected on the basis of the detection results. The ranging devices 2 may be provided at the same positions as the cameras 1a to 1d or may also be provided at different positions. The control device 10 can also detect a gesture of the operator M on the basis of the images captured by the cameras 1a to 1d and identify the operation command associated with the gesture.

Figure 2B:
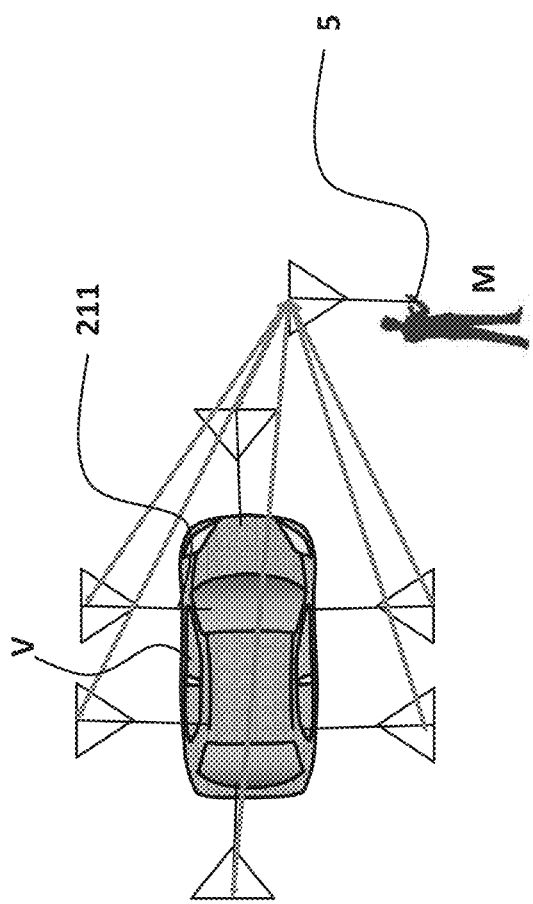
FIG. 2B is a diagram for describing a second detection scheme for the position of an operator.

As illustrated in FIG. 2B, the position of the operation terminal 5 or of the operator M carrying the operation terminal 5 may also be detected on the basis of the communication radio waves between multiple antennas 211 provided at different positions of the vehicle V and the operation terminal 5. When the multiple antennas 211 communicate with one operation terminal 5, the intensity of the received radio wave of each antenna 211 is different. The position of the operation terminal 5 can be calculated on the basis of the intensity difference between the received radio waves of the antennas 211. The two-dimensional position and/or three-dimensional position of the operation terminal 5 or of the operator M can be calculated from the intensity difference between the received radio waves of the antennas 211.

Figure 2C:
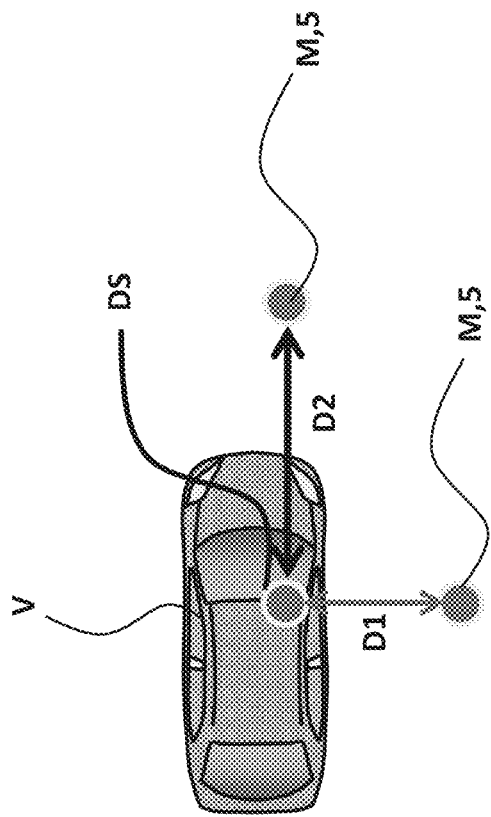
FIG. 2C is a diagram for describing a third detection scheme for the position of an operator.

As illustrated in FIG. 2C, a predetermined position (direction/distance: D1, D2) with respect to the driver seat DS of the vehicle V may be preliminarily designated as the operating position of the operator M or as the position at which the operation terminal 5 is located. For example, when the operator M temporarily stops the vehicle V at a specified position and gets off the vehicle V to operate the operation terminal 5 located at the predetermined position, it is possible to detect the initial position of the operator M with respect to the vehicle V or the initial position of the terminal 5, which is carried by the operator M, with respect to the vehicle V.

Figure 2D:
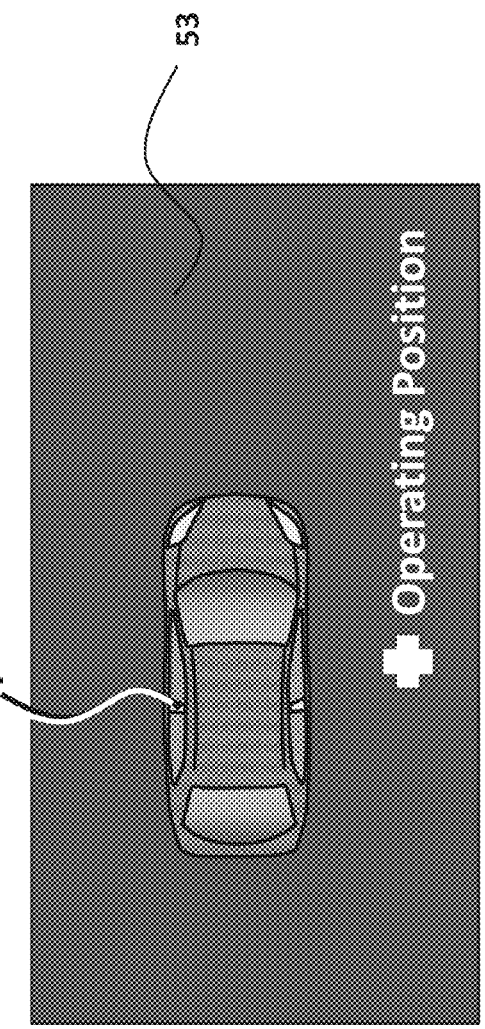
FIG. 2D is a diagram for describing a fourth detection scheme for the position of an operator.

As illustrated in FIG. 2D in a similar manner, image information representing the operating position (a position at which the operator M is located: operation position) with respect to the vehicle V is displayed on the display 53 of the operation terminal 5. This display control may be executed by an application stored on the operation terminal 5 side or may also be executed on the basis of a command from the control device 10.

In one or more embodiments of the present invention, the observation position of the operator M is calculated to calculate a first area which the operator M can visually recognize or a second area (blind area) which the operator M cannot visually recognize. When calculating the first area (or the second area), the detected two-dimensional position of the operator M may be calculated as the observation position. In this calculation, the eye position of the operator M (height information) may be taken into account. A position corresponding to the eye position of the operator M is calculated as the observation position on the basis of the two-dimensional position of the operation terminal 5 obtained by the above scheme. The observation position may be calculated using the standing height of the operator M, which is preliminarily set, or the average standing height of the adult. When the detection signal representing the positional information of the operation terminal 5 includes height information, the position of the operation terminal 5 may be employed as the observation position.

The detection process for an obstacle will be described with reference to FIGS. 3A and 3B. Obstacles include structures, such as walls and pillars of a parking lot, installations around the vehicle, pedestrians, other vehicles, parked vehicles, etc.

Figure 3A:
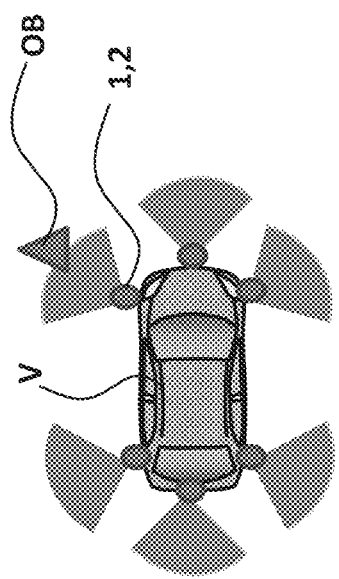
FIG. 3A is a diagram for describing a first detection scheme for an obstacle.

As illustrated in FIG. 3A, an obstacle is detected on the basis of the detection results of the multiple ranging devices 2 provided in the vehicle V and the images captured by the cameras 1. The ranging devices 2 detect the presence or absence of an object, the position of the object, the size of the object, and the distance to the object on the basis of the received signals of radar devices. In addition or alternatively, the presence or absence of an object, the position of the object, the size of the object, and the distance to the object may be detected on the basis of the images captured by the cameras 1a to 1d. The detection of an obstacle may be performed using a motion stereo technique with the cameras 1a to 1d. The detection results are used to determine whether a parking space is empty or not (whether or not a vehicle is parked in the parking space).

As illustrated in FIG. 3B, obstacles including structures such as walls and pillars of a parking lot can be detected on the basis of the parking lot information 34 acquired from the storage device 32 of the information server 3. The parking lot information includes the location and identification number of each parking lot and positional information of passages, pillars, walls, storage spaces, etc. in the parking facility. The information server 3 may be managed by staffs of the parking lot.

The calculation process for the first area and/or second area will then be described. On the basis of the positional relationship between the position of an obstacle and the position of the operator M, the control device 10 calculates the first area which the operator M can observe from the calculated observation position of the operator M. The control device 10 calculates, as the first area, an area in which the visual field is not shaded by an obstacle when the operator M observes from the observation position. The control device 10 calculates, as the second area, an area in which the visual field is shaded by an obstacle when the operator M observes from the observation position. The second area which is unobservable or visually unrecognizable from the operator M can be calculated from the positional relationship with the obstacle. A blind area caused not only by an obstacle but also by the vehicle V to be operated may also be set as the second area which is visually unrecognizable. The control device 10 calculates, as the second area, an area in which when the operator M observes from the observation position, the visual field is shaded by the vehicle to be operated. The second area which is unobservable from the operator M can be calculated from the positional relationship with the vehicle to be parked. As will be understood, obstacles include other vehicles that are not the targets of operation. From the viewpoint of reducing the calculation load, the control device 10 may calculate the second area first and set an area other than the second area as the first area. In addition or alternatively, the second area may be set as a relatively wide area in consideration of the detection accuracy of an obstacle and the detection accuracy of the position of the operator M.

Figure 4A:
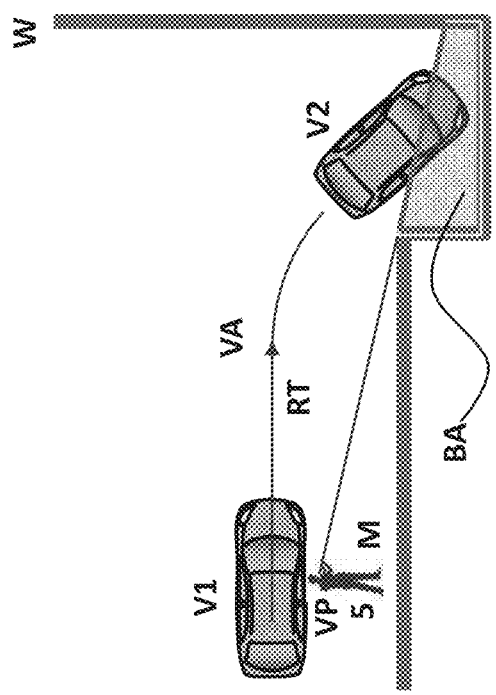
FIG. 4A is a diagram for describing a first calculation scheme for a first area and a second area (blind area)

FIG. 4A illustrates an example of the case in which a blind area occurs due to the structure of the parking lot. In the example illustrated in FIG. 4A, the vehicle M1 moves along a parking route RT and the operator M standing on the side of the vehicle V1 operates the operation terminal 5. The control device 10 calculates, as a first area VA, an area that can be estimated to be visually recognizable without being shaded by another object when the operator M observes from an observation position VP. In the example of FIG. 4A, the visual field of the operator M is shaded by a wall W of the parking lot. The control device 10 calculates, as a second area BA, an area that is estimated to be hidden behind the wall W and visually unrecognizable when the operator M observes from the observation position VP.

Figure 4B:
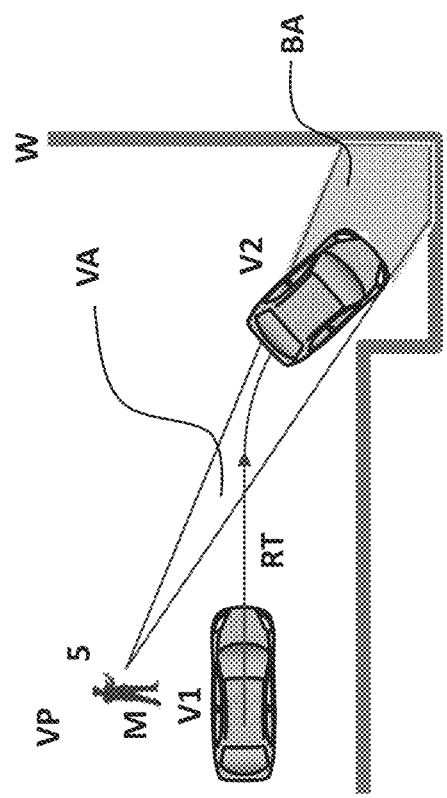
FIG. 4B is a diagram for describing a second calculation scheme for a first area and a second area (blind area)

FIG. 4B illustrates an example of the case in which a blind area occurs due to the vehicle itself to be controlled. The control device 10 calculates, as the first area VA, an area that can be estimated to be visually recognizable without being shaded by another object when the operator M observes from the observation position VP. In the example of FIG. 4B, the visual field of the operator M is shaded by the vehicle V2 which is located at a position of turn for parking on the estimated parking route. The control device 10 calculates, as the second area BA, an area that is estimated to be hidden behind the vehicle V2 and visually unrecognizable when the operator M observes from the observation position VP. The control device 10 preliminarily stores the vehicle information, such as the height and size of the vehicle, which is used in the calculation of the second area BA. The vehicle information may be information unique to the vehicle or may also be information defined in accordance with the vehicle type and the like.

Figure 4C:
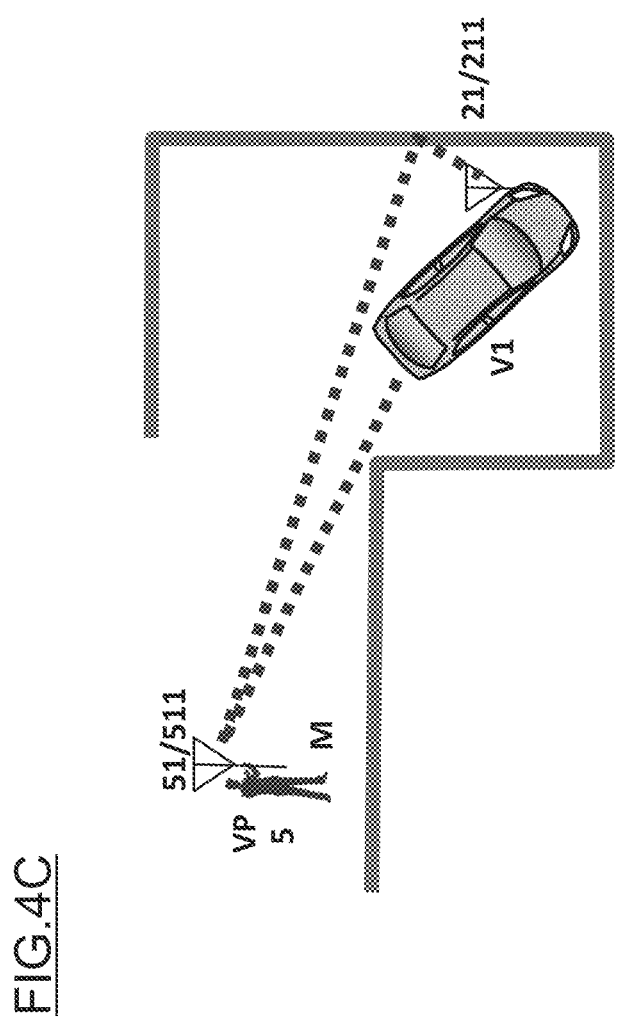
FIG. 4C is a diagram for describing a third calculation scheme for a first area and a second area (blind area)

As illustrated in FIG. 4C, on the basis of the intensity of the received radio waves, generation of reflected waves, occurrence of interference and multipath, etc. between a communication device 51 and an antenna 511 of the operation terminal 5 and the communication device 21 and antennas 211 of the communication device 21 of the parking control apparatus 100, the presence of a recessed part may be determined from the position of the wall of the parking lot or the shape of the space, and the presence of a blind area may be determined on the basis of the determination result.

The control device 10 calculates a parking route and a control instruction for moving along the parking route such that a first proximity level of the vehicle V to an obstacle in the first area VA is higher than a second proximity level of the vehicle V to the obstacle in the second area BA. The control device 10 calculates a parking route RT and a control instruction for the vehicle V to move along the parking route RT such that at least a part of the vehicle V exists in the first area VA along at least a part of the parking route RT of the vehicle V. The control instruction includes a speed and acceleration/deceleration when moving along the parking route RT, a position (timing) at which the acceleration/deceleration is executed, a position of turn for parking, a steering amount, etc.

The control procedure of parking control will be described below with reference to the flowchart illustrated in FIG. 5.

Figure 5:
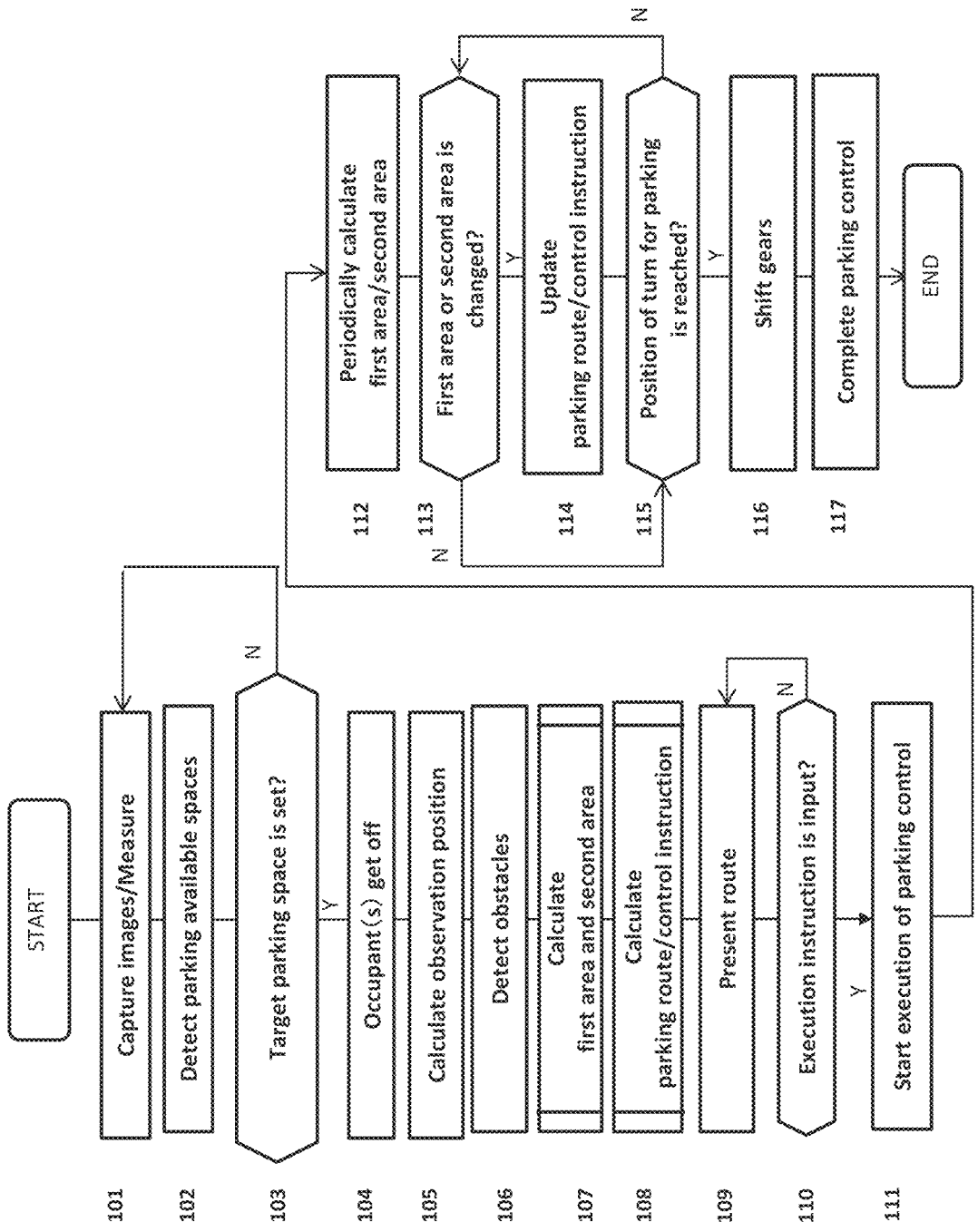
FIG. 5 is a flowchart illustrating an example of a control procedure in the parking control system according to one or more embodiments of the present invention.

FIG. 5 is a flowchart illustrating the control procedure of the parking control process executed by the parking control system 1000 according to one or more embodiments of the present invention. The trigger for starting the parking control process is not particularly limited, and the parking control process may be triggered by the operation of a start switch of the parking control apparatus 100.

The parking control apparatus 100 according to one or more embodiments of the present invention has a function of moving the vehicle V in an automated or autonomous manner to a parking space on the basis of the operation command acquired from outside of the vehicle.

In step 101, the control device 10 of the parking control apparatus 100 according to one or more embodiments of the present invention acquires ranging signals from the ranging devices 2 which are attached to multiple sites of the vehicle V. The control device 10 acquires images captured by the cameras 1a to 1d attached to multiple sites of the vehicle V. Although not particularly limited, the camera 1a is disposed on the front grille part of the vehicle V, the camera 1d is disposed in the vicinity of the rear bumper, and the cameras 1b to 1c are disposed on the lower parts of the right and left door mirrors. The cameras 1a to 1d may each be a camera having a wide-angle lens with a wide view angle. The cameras 1a to 1d capture images of boundary lines of parking spaces around the vehicle V and objects existing around the parking spaces. The cameras 1a to 1d may be CCD cameras, infrared cameras, or other appropriate imaging devices.

In step 102, the control device 10 detects parking spaces into which parking is possible. The control device 10 detects frames (areas) of parking spaces on the basis of the images captured by the cameras 1a to 1d. The control device 10 detects empty parking spaces using the detection data of the ranging devices 2 and the detection data extracted from the captured images. The control device 10 detects parking available spaces from among the parking spaces. The parking available spaces are parking spaces which are empty (i.e., other vehicles are not parked) and to which routes for completing the parking can be calculated. In one or more embodiments of the present invention, the condition that a parking route can be calculated means that a trajectory of the route from the current position to a target parking space can be rendered on road surface coordinates without interfering with obstacles (including parked vehicles).

In step 103, the control device 10 transmits the parking available spaces to the operation terminal 5, controls the display 53 to display the parking available spaces, and requests the operator to input selection information of the target parking space for parking the vehicle. The target parking space may be automatically selected by the control device 10 or the parking facility side. When an operation command of specifying a parking space is input to the operation terminal 5, the parking space is set as the target parking space.

In one or more embodiments of the present invention, the occupants are made to get off the vehicle in step 104. The vehicle is then moved to the target parking space by remote control. The target parking space may be selected after the occupants get off the vehicle.

In step 105, the control device 10 detects the position of the operator M using the previously described scheme and calculates the observation position VP on the basis of the position of the operator M. In step 106, the control device 10 detects the position at which an obstacle exists using the previously described scheme.

In step 107, the first area observable by the operator M from the observation position VP is calculated. The first area is calculated on the basis of the position of the obstacle. The control device 10 calculates the second area unobservable by the operator M from the observation position VP. The second area is calculated on the basis of the position of the obstacle. The position of an obstacle refers to the position of an area in which the obstacle exists. That is, the position of an obstacle is represented by the coordinate values of an occupied area by the obstacle in the three-dimensional coordinates.

In step 108, the control device 10 calculates a parking route from a stop position of the vehicle to the target parking space. The parking route includes a position of turn necessary for moving to the parking space. Here, the parking route is defined as a line and may also be defined as a belt-like area corresponding to the occupied area by the vehicle in accordance with the vehicle width. The occupied area by the vehicle is defined in consideration of the vehicle width and a margin width that is ensured for movement. In this step, the control device 10 calculates a control instruction for the vehicle to move along the parking route. The control instruction includes an operation instruction for any one or more of a steering amount, a steering speed, steering acceleration, a shift position, a speed, acceleration, and deceleration of the vehicle. The control instruction also includes the execution timing or execution position of the above operation instruction for the vehicle.

In the parking control, the vehicle to be controlled and an obstacle have to be avoided from excessively coming close to each other and coming into contact with each other from the start of movement to the completion of parking. The parking route is calculated on the assumption that a certain relationship of proximity/separation is maintained between the detected obstacle and the vehicle. In one or more embodiments of the present invention, the "proximity level" is defined as a value for quantitatively evaluating the relationship of proximity/separation between an obstacle and the vehicle in the parking control.

The control device 10 calculates the parking route on the basis of the proximity level between the vehicle V and an obstacle. The proximity level between the vehicle V and an obstacle refers to an index indicating the degree of proximity which is allowed between the vehicle V and the obstacle when calculating the parking route.

A "high proximity level" indicates that the vehicle and an obstacle are relatively close vicinity of each other. A "low proximity level" indicates that the vehicle and an obstacle are separated from each other.

The proximity level can be represented by a margin distance that allows the vehicle V to come close to an obstacle, a turning distance from an obstacle to a point of turn for parking, or a separation distance from an obstacle to the parking route.

The control device 10 obtains the first proximity level and the second proximity level. The first proximity level represents a degree of proximity of the vehicle to an obstacle in the first area while the second proximity level represents a degree of proximity of the vehicle to the obstacle in the second area. The control device 10 obtains the first proximity level and the second proximity level such that the first proximity level is higher than the second proximity level, and calculates the parking route on the basis of the first proximity level and the second proximity level. The degree of proximity between the vehicle and an obstacle in the first area is allowed to be higher than the degree of proximity between the vehicle and the obstacle in the second area. The parking route is calculated such that the vehicle is in closer vicinity of the obstacle in the first area than in the second area. If the second area does not exist, the first proximity level is set higher than a standard proximity level that is preliminarily set, and the parking route of the vehicle V is calculated such that the first proximity level between the vehicle and the obstacle is less than the standard proximity level.

Figure 6:
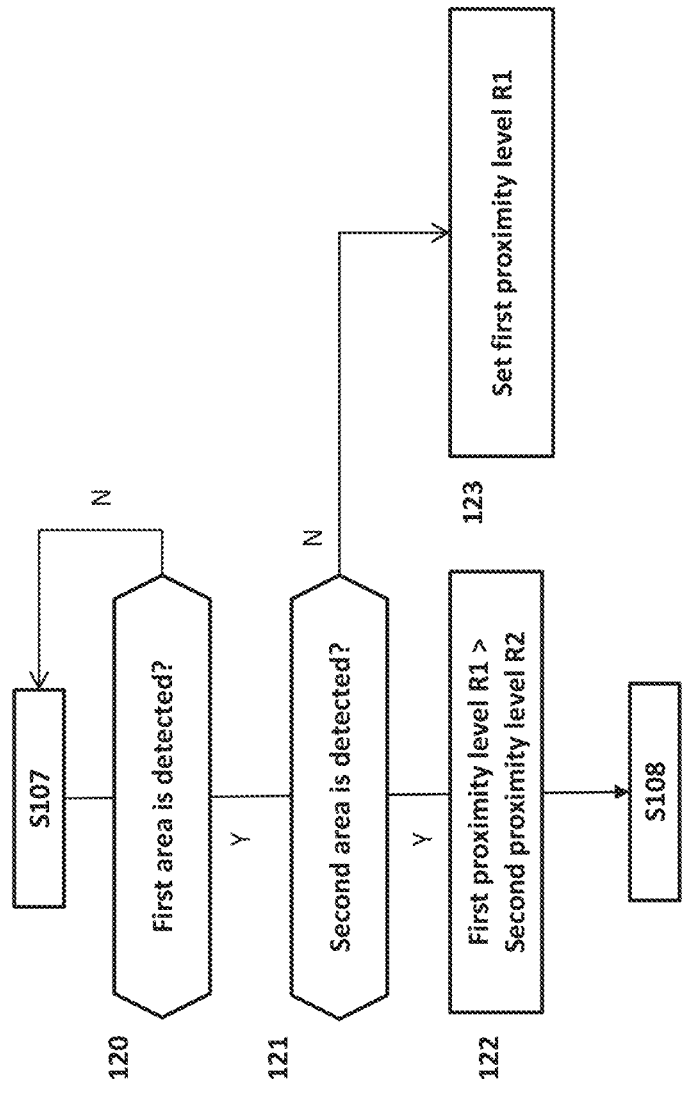
FIG. 6 is a flowchart illustrating a first example of a setting scheme for a proximity level to an obstacle.

In step 120 of FIG. 6, it is confirmed that the first area has been detected in step 107 of FIG. 5. In step 121, it is confirmed that the second area has been detected.

Figure 7A:
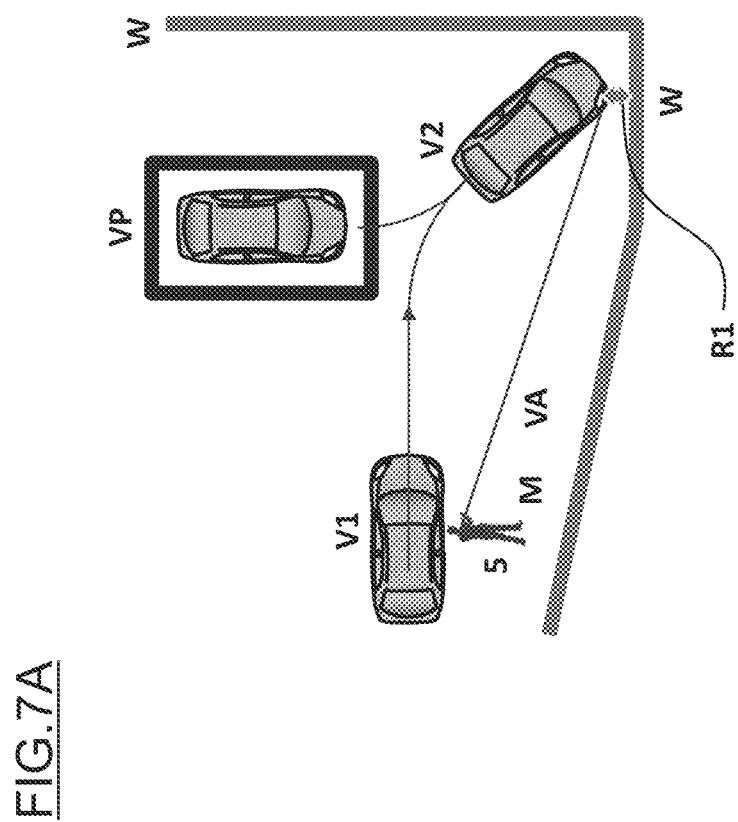
FIG. 7A is a first diagram for describing a setting scheme for the proximity level to an obstacle.

FIG. 7A illustrates positions V1, V2, and VP of a vehicle that moves for parking. In the situation illustrated in the figure, the operator M can visually recognize, from the observation position based on the position of the operator M, the situation in which the vehicle comes close to an obstacle along the parking route until the vehicle is parked. In the situation illustrated in the figure, a blind area caused by the wall W as an obstacle is not formed. The first area VA observable from the operator M is defined between the observation position of the observer M and the wall W. FIG. 7A illustrates an example in which a blind area caused by the vehicle V is not set as the second area. Thus, in a situation in which the operator M can estimate a blind area caused by the vehicle V, the blind area caused by the vehicle V may not have to be set as the second area.

Detection of the first area VA and the second area BA is followed by step 122, in which the first proximity level of the vehicle to an obstacle in the first area VA is set higher than the second proximity level of the vehicle to the obstacle in the second area BA (first proximity level>second proximity level). No detection of the second area (blind area) is followed by step 123, in which the first proximity level is set. The shorter the margin distance of the vehicle V to the obstacle, the higher the proximity level.

Figure 7B:
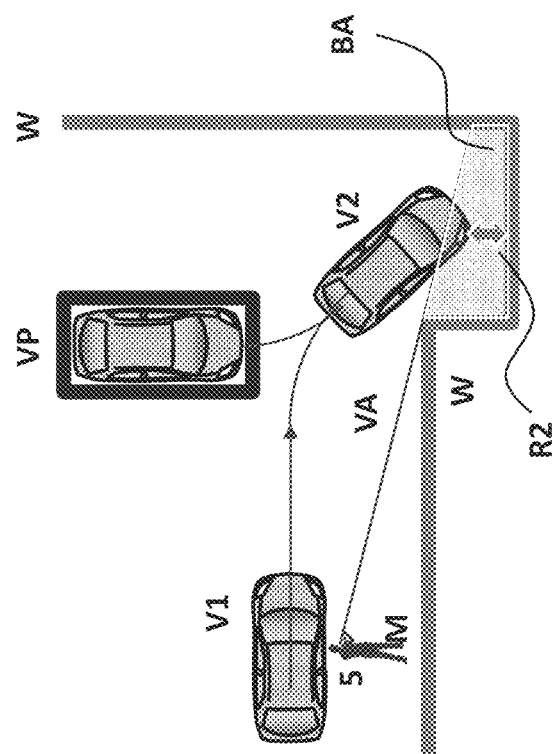
FIG. 7B is a second diagram for describing a setting scheme for the proximity level to an obstacle.

FIG. 7B illustrates positions V1, V2, and VP of a vehicle that moves for parking. In the situation illustrated in the figure, when viewed from the observation position of the operator M based on the position of the operation terminal 5, the right-side front portion of the vehicle V2 located at the position of turn for parking belongs to the second area BA formed due to the wall W. The control device 10 sets the second proximity level for the right-side front portion in which the distance between the vehicle V2 and the wall W is shortest. The second proximity level may be set for each portion of the vehicle V or may also be set as a value applied to the vehicle as a whole. The control device 10 sets the second proximity level represented by a second margin distance R2 that is longer than a first margin distance R1 illustrated in FIG. 7A (second margin distance R2>first margin distance R1). This allows the first proximity level of the vehicle V to the obstacle in the first area VA to be set higher than the second proximity level of the vehicle V to the obstacle in the second area BA.

Figure 7C:
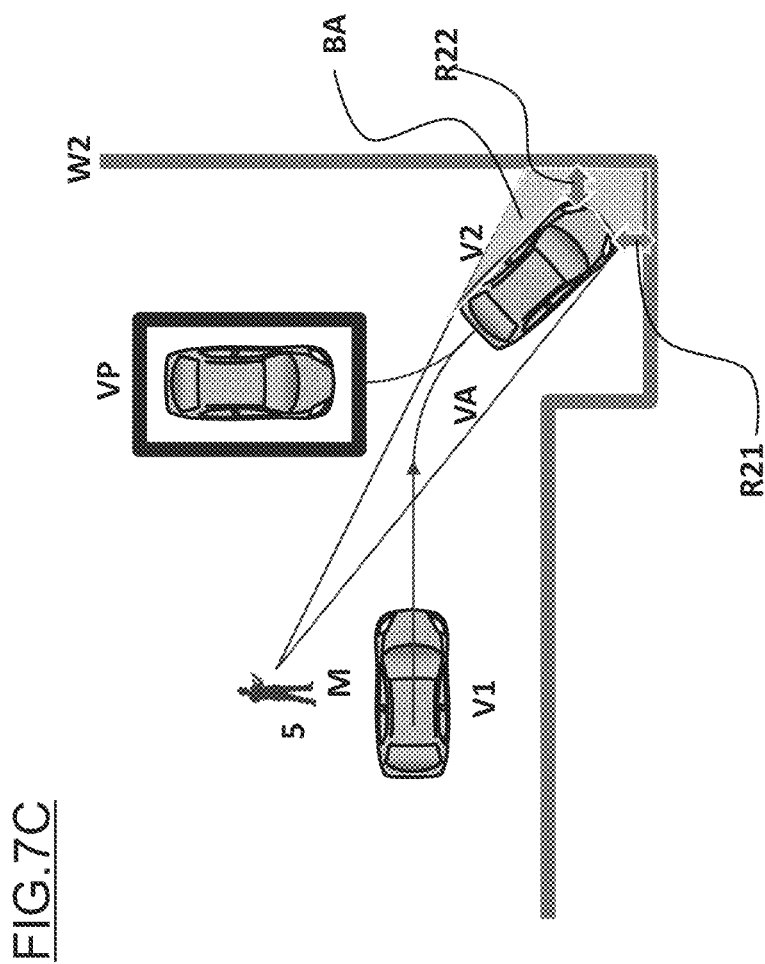
FIG. 7C is a third diagram for describing a setting scheme for the proximity level to an obstacle.

FIG. 7C illustrates a case in which an unobservable second area is formed due to the vehicle V to be controlled. Also in such a case, the second area is detected and a determination is made that the vehicle V belongs to the second area. This is a scene in which the vehicle V and a part of its periphery cannot be observed. In the situation illustrated in the figure, when viewed from the observation position based on the position of the operator M, the left-side front portion, front portion, and right-side front portion of the vehicle V2 located at the position of turn for parking belong to the second area BA formed due to the vehicle V2. The control device 10 sets a second margin distance R21 for the right-side front portion and a second margin distance R22 for the left-side front portion in which the distance between the vehicle V2 and the wall W is a predetermined value or less. The control device 10 sets the second margin distances R21 and R22 to longer values than the first margin distance R1 illustrated in FIG. 7A (second margin distances R21 and R22>first margin distance R1).

Figure 7D:
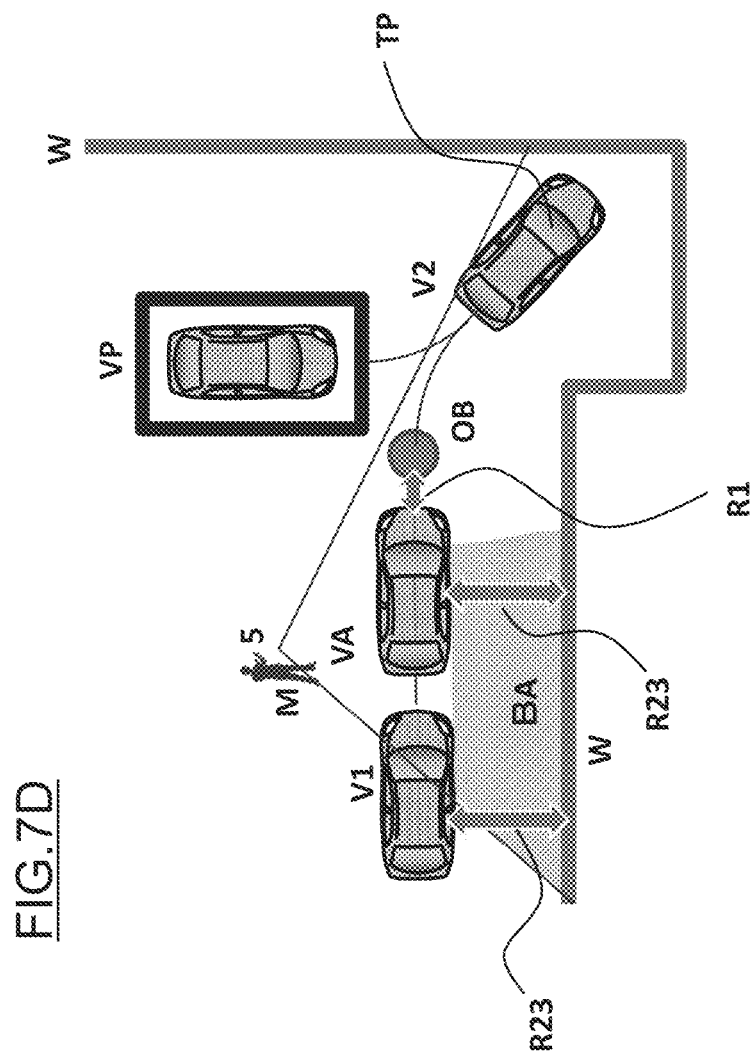
FIG. 7D is a fourth diagram for describing a setting scheme for the proximity level to an obstacle.

FIG. 7D also illustrates a case in which an unobservable second area is formed due to the vehicle V to be controlled. This example represents a scene in which the opposite side of the vehicle V and its surroundings are unobservable because the operator M is located on the side of the vehicle V to be controlled. In the situation illustrated in the figure, when viewed from the observation position of the operator M, the right-side portion of the vehicle V2 moving straight ahead toward the position of turn for parking belongs to the second area BA formed due to the vehicle V1. The control device 10 sets a second proximity level R23 for the right-side portion of the vehicle V1. The control device 10 sets the second margin distance R23 to a longer distance than the first margin distance R1 illustrated in FIG. 7A (second margin distance R23>first margin distance R1).

Figure 7E:
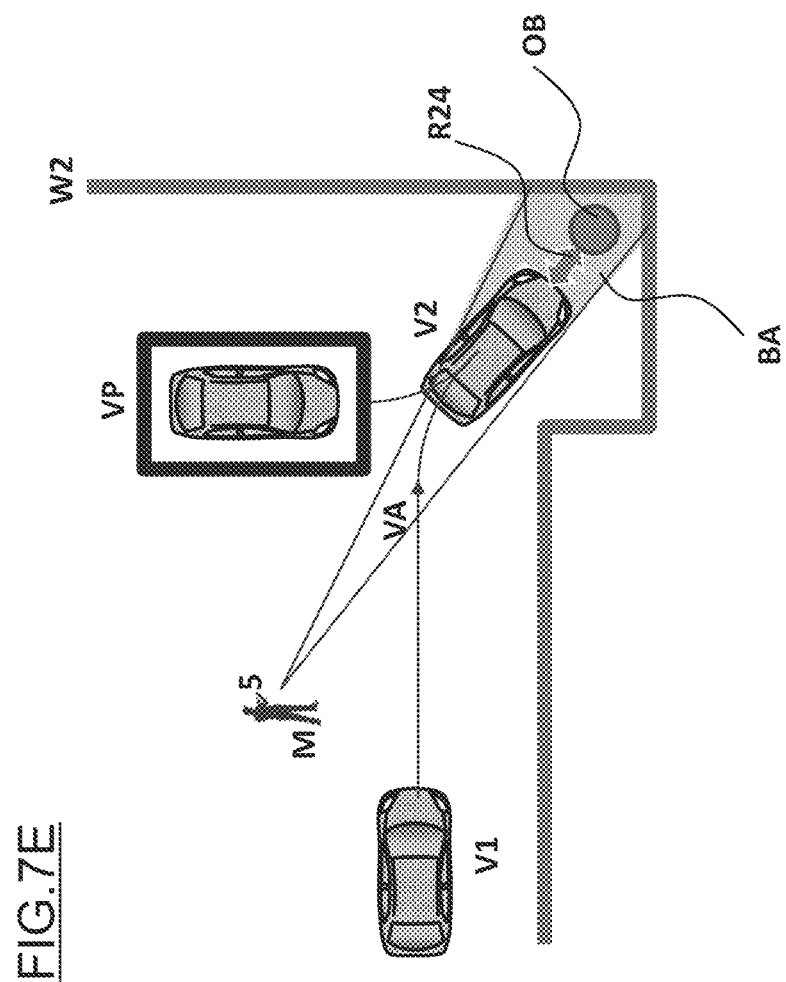
FIG. 7E is a fifth diagram for describing a setting scheme for the proximity level to an obstacle.

FIG. 7E illustrates a case in which an unobservable second area is formed due to the vehicle V to be controlled and, in addition to this, an obstacle OB other than the wall W exists in the second area. In the situation illustrated in the figure, when viewed from the observation position of the operator M based on the position of the operation terminal 5, a second area BA is formed in front of the vehicle V2 due to the vehicle V2 located at the position of turn for parking. The obstacle OB exists in the second area BA. The proximity level is also defined between the obstacle OB and the vehicle V2. The control device 10 sets a second margin distance R24 between the vehicle V2 and the obstacle OB. The control device 10 sets the second margin distance R24 to a longer value than the first margin distance R1 illustrated in FIG. 7A (second margin distance R24>first margin distance R1).

In one or more embodiments of the present invention, the first proximity level of the vehicle V to an obstacle in the first area observable from the observation position is set higher than the second proximity level of the vehicle V to the obstacle in the second area unobservable from the observation position. The first proximity level may represent a degree of proximity to the obstacle when the vehicle V travels in the first area and the second proximity level may represent a degree of proximity to the obstacle when the vehicle V travels in the second area. In the area observable by the operator M, the vehicle and the obstacle are allowed to come closer to each other than in the area unobservable by the operator M. The proximity level between the vehicle and the obstacle can thus be adjusted in accordance with the observation situation of the operator M.

In the first area observable by the operator, the vehicle is moved while coming closer to the obstacle than in the second area; therefore, even though the obstacle exists, the parking control can be continued. The parking control process is not interrupted without exception due to the existence of the obstacle because, depending on the situation, the vehicle and the obstacle are allowed to come close to each other. In general, the clearance (margin distance) between the vehicle and an obstacle is set in consideration of safety. The larger the clearance (margin distance), the higher the safety, but the possibility and frequency of the interruption of the parking control process will be high, and the comfort and the usability may be sacrificed because additional operations and instructions from the operator are required. According to the parking control method in one or more embodiments of the present invention, the first proximity level applied in the first area is changed to a value that is relatively higher than the second proximity level applied in the second area; therefore, the number of scenes in which the parking control process is continued increases, and both the comfort and usability and the safety can be achieved.

Although not particularly limited, the first proximity level is represented by a first margin distance that allows the vehicle V to come close to an obstacle in the first area, and the second proximity level is represented by a second margin distance that allows the vehicle V to come close to the obstacle in the second area. The first margin distance can be expressed by a length (distance). The first margin distance is set shorter than the second margin distance.

The first proximity level may be represented by a first turning distance from an obstacle to a first position of turn belonging to the first area VA, and the second proximity level may be represented by a second turning distance from the obstacle to a second position of turn belonging to the second area. The parking route used in the parking control process includes a position of turn for parking at which the moving direction is switched. The position of the vehicle V2 in FIG. 7A corresponds to the first position of turn, and the position of the vehicle V2 in FIG. 7B corresponds to the second position of turn. In the parking route, the possibility of coming close to an obstacle is highest at the position of turn for parking. When at least a part of the vehicle V exists in the first area at the first position of turn, the proximity level is set higher than when at least a part of the vehicle V exists in the second area at the second position of turn. The control device 10 sets the first turning distance shorter than the second turning distance. This allows the first position of turn and the obstacle to come relatively close to each other in the first area VA, and the parking control process can be continued. The first turning distance and the second turning distance may each be set to a distance to the outer body of the vehicle V closest to the obstacle.

The first proximity level may be represented by a first separation distance from an obstacle to the parking route RT, and the second proximity level may be represented by a second separation distance from the obstacle to the parking route RT. When calculating the parking route, the parking route is generated such that each point on the parking route is separated from the obstacle by a predetermined distance. The predetermined distance can be preliminarily set in accordance with the size of the vehicle and the clearance (margin distance) to the obstacle. The first separation distance when the parking route exists in the first area is set shorter than the second separation distance when the parking route exists in the second area. Specifically, the clearance (margin distance) to the obstacle in the first separation distance is set shorter than the clearance (margin distance) to the obstacle in the second separation distance. This allows the parking route and the obstacle to come closer to each other in the first area VA than in the second area BA, and the parking control process can be continued.

Calculation of the control instruction will then be described.

In step S108 of FIG. 5, the control device 10 generates a control instruction for the vehicle to move along the parking route RT. A subroutine for generation of the control instruction will be described. The control instruction includes any one or more of the deceleration start timing, deceleration completion distance, deceleration, and target speed when approaching an obstacle.

The setting scheme for the deceleration start timing in the control instruction will first be described.

Figure 8:
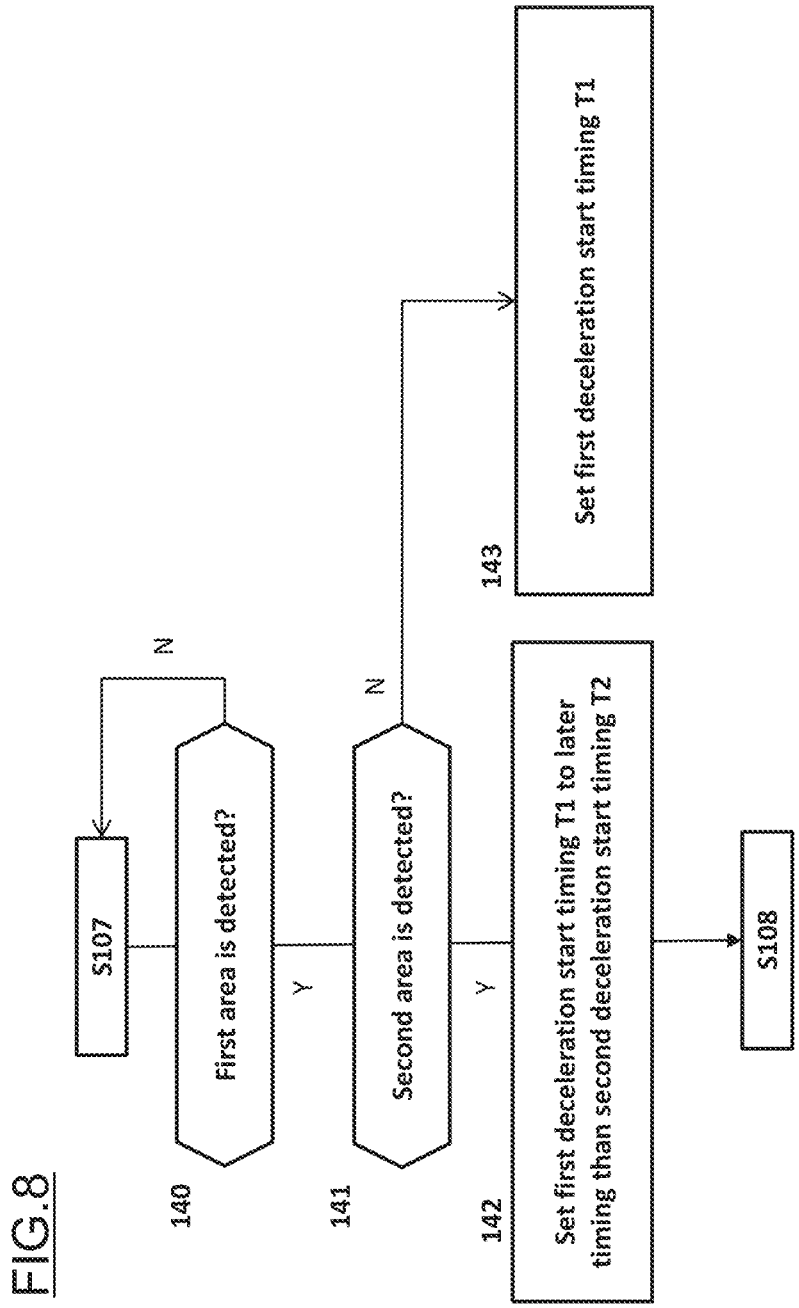
FIG. 8 is a flowchart illustrating a setting scheme for deceleration start timing.

In step 140 of FIG. 8, the existence of the first area is confirmed, and in step 141, the existence of the second area is confirmed. In step 142, the control device 10 generates the control instruction which includes the deceleration start timing for starting deceleration of the vehicle. The deceleration start timing is a form of the proximity level. Delaying the deceleration start timing for starting the deceleration performed when approaching an obstacle means that the deceleration is started after coming close to the obstacle. Delaying the deceleration start timing means that the proximity level is increased. On the other hand, advancing the deceleration start timing means that the proximity level is lowered.

Figure 9A:
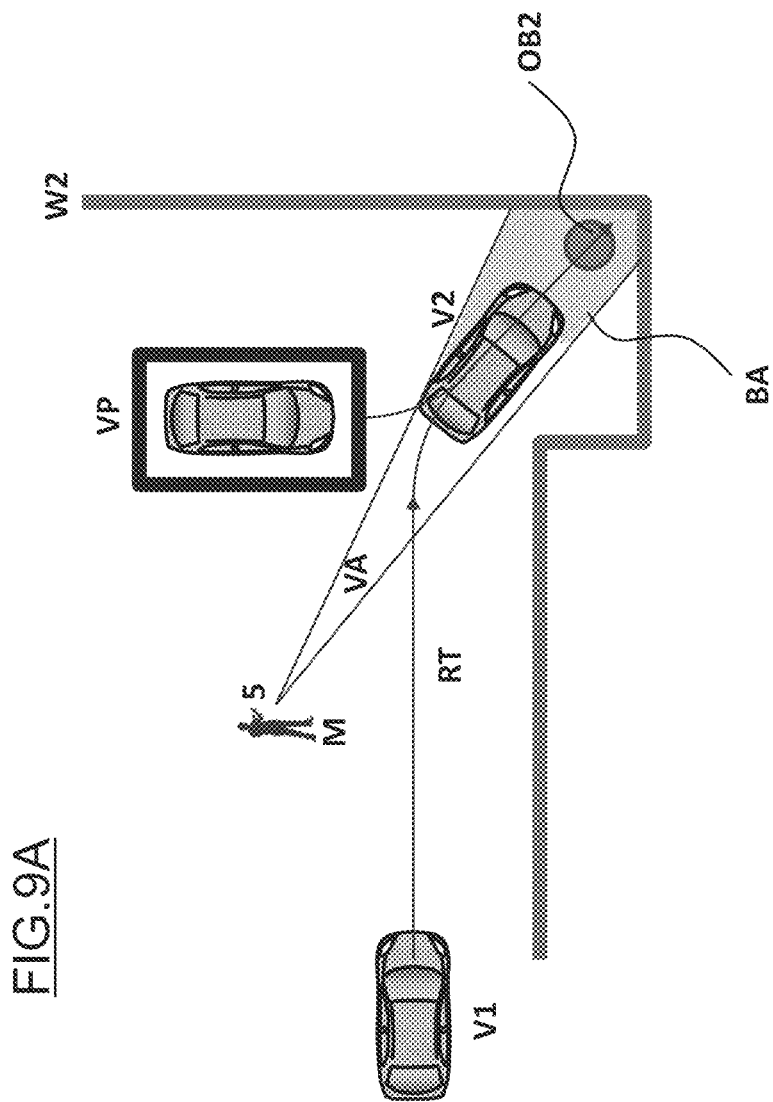
FIG. 9A is a first diagram for describing a setting scheme for the deceleration start timing.

FIG. 9A and FIG. 9B each illustrate a parking route RT that passes through the first area VA and the second area BA. FIG. 9A illustrates a state in which an obstacle OB2 exists ahead of the vehicle V2 located at the position of turn for parking. The obstacle OB2 belongs to the second area VA. FIG. 9B illustrates a state in which an obstacle OB1 belonging to the first area VA exists ahead of the vehicle V2 located at the position of turn for parking.

Figure 9C:
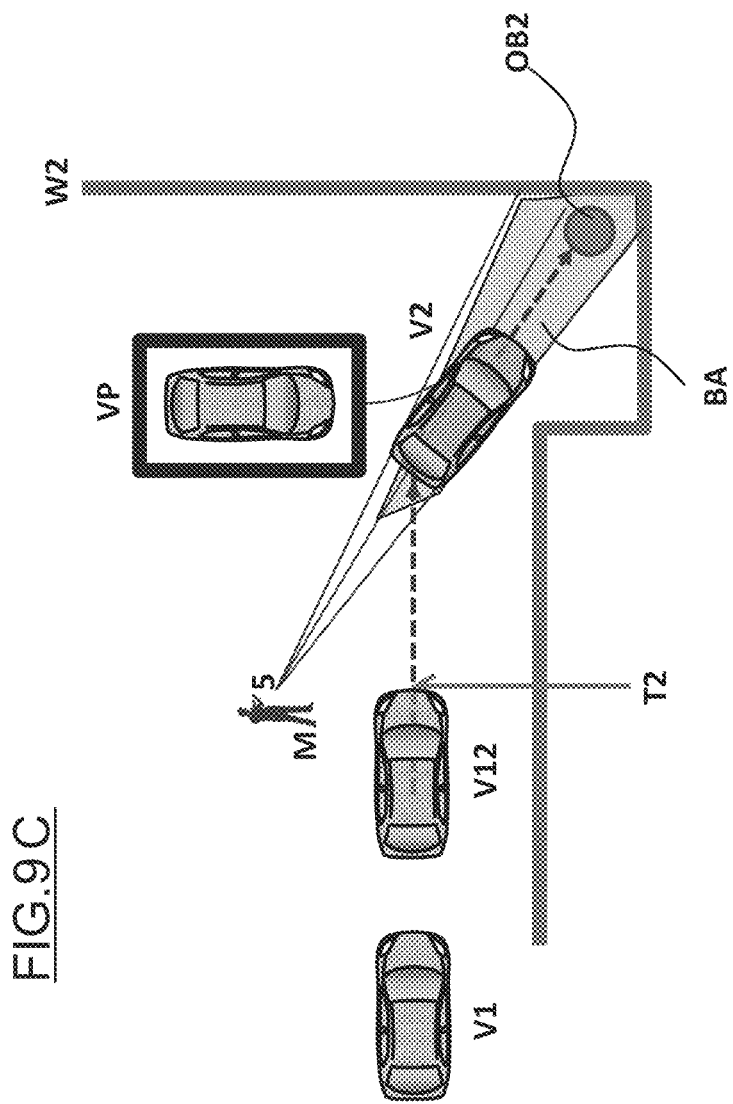
FIG. 9C is a third diagram for describing a setting scheme for the deceleration start timing.
Figure 9D:
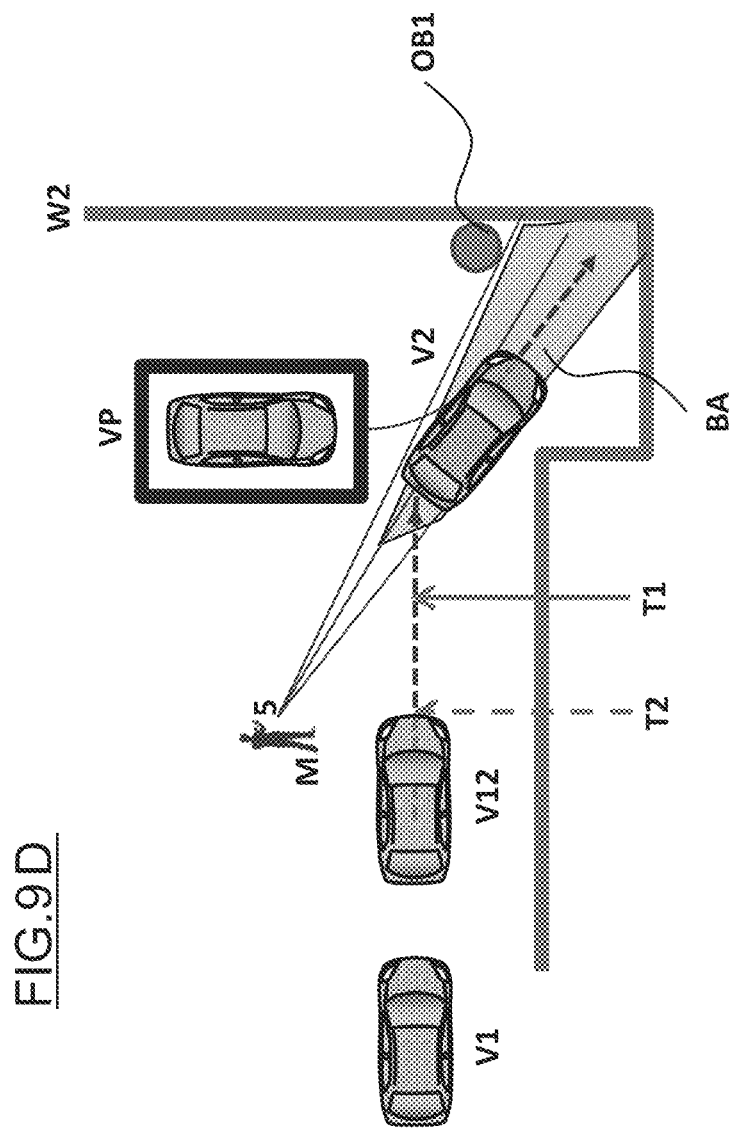
FIG. 9D is a fourth diagram for describing a setting scheme for the deceleration start timing.

In step 142, the control device 10 sets first deceleration start timing T1 or second deceleration start timing T2. The first deceleration start timing T1 is timing for starting deceleration when approaching the obstacle OB1, and the second deceleration start timing T2 is timing for starting deceleration when approaching the obstacle OB2. The control device 10 calculates the control instruction such that the first deceleration start timing T1 is later timing than the second deceleration start timing T2. FIG. 9C illustrates the second deceleration start timing T2 when the obstacle OB2 exists. FIG. 9D illustrates the first deceleration start timing T1 when the obstacle OB1 exists. The first deceleration start timing T1 is later timing than the second deceleration start timing T2. The distance between the position of the vehicle V and the obstacle OB1 at the first deceleration start timing T1 is shorter than the distance between the position of the vehicle V and the obstacle OB2 at the second deceleration start timing T2. The control device 10 controls the vehicle to move along the parking route in accordance with the calculated control instruction. By making the first deceleration start timing later than the second deceleration start timing, the time for passing through the first area can be shortened. As a result, the time required from the parking start to the parking completion can be shortened. When only the first area is detected, a control instruction for the parking control process including the first deceleration start timing T1 is generated.

The deceleration start timing can be expressed by the time corresponding to the approach speed between the vehicle and an obstacle. The time corresponding to the approach speed is calculated as TTC: Time-To-Collision, which is the time until the collision. The first deceleration start timing is set as a first TTC, and the second deceleration start timing is set as a second TTC. The vehicle V starts to decelerate at timing when the calculated TTC becomes shorter than the set first TTC or second TTC. By setting the first TTC shorter than the second TTC, the deceleration start timing for starting deceleration performed in the first area when approaching the obstacle is delayed as compared with that in the second area, and the deceleration is started after coming close to the obstacle. Delaying the deceleration start timing means that the proximity level is increased. On the other hand, advancing the deceleration start timing means that the proximity level is lowered.

FIG. 9E illustrates a temporal change of the speed in the control instruction. The control instruction when traveling in the first area is indicated by a solid line and the control instruction when traveling in the second area (blind area) is indicated by a broken line. As illustrated in the figure, the first deceleration start timing T1 in the first area is a time later than the second deceleration start timing T2 in the second area.

From the same viewpoint, a deceleration completion distance can be set. The control device 10 generates the control instruction which includes the deceleration completion distance to a deceleration completion point at which the deceleration of the vehicle is completed. The deceleration completion distance is a form of the proximity level. Shortening the deceleration completion distance from the point at which the deceleration performed when approaching an obstacle is completed to the position of the obstacle means that the deceleration is completed in a state of coming as close as possible to the obstacle. Shortening the deceleration completion distance means that the proximity level is increased. On the other hand, increasing the deceleration completion distance means that the proximity level is lowered. This process can be performed together with or instead of the above-described step 142 of FIG. 8. By making the first deceleration completion distance shorter than the second deceleration completion distance to allow the vehicle to come as close as possible to the obstacle, the vehicle can continue to move in the parking control.

The setting scheme for deceleration in the control instruction will then be described.

In step 150 of FIG. 10, the existence of the first area is confirmed, and in step 151, the existence of the second area is confirmed. The control device 10 generates the control instruction which includes the deceleration of the vehicle. The deceleration is a form of the proximity level. High deceleration performed when approaching an obstacle means that the proximity level, which represents a degree of proximity to an obstacle, is high. On the other hand, low deceleration means that the proximity level, which represents a degree of proximity to the obstacle, is low.

Figure 11A:
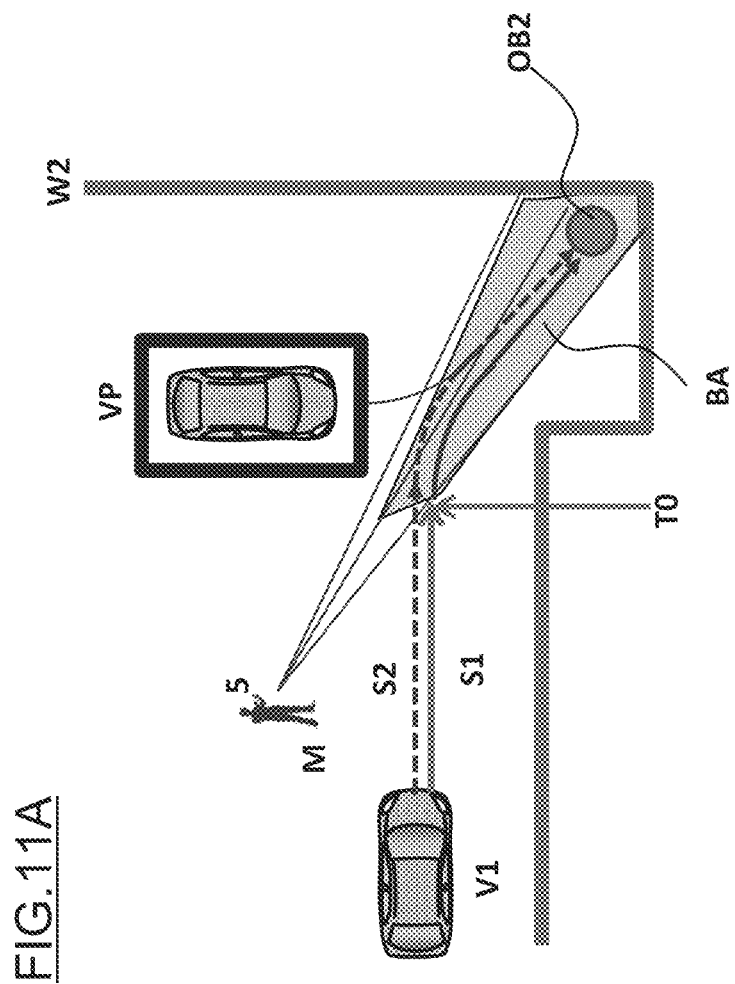
FIG. 11A is a first diagram for describing a setting scheme for the deceleration.
Figure 11B:
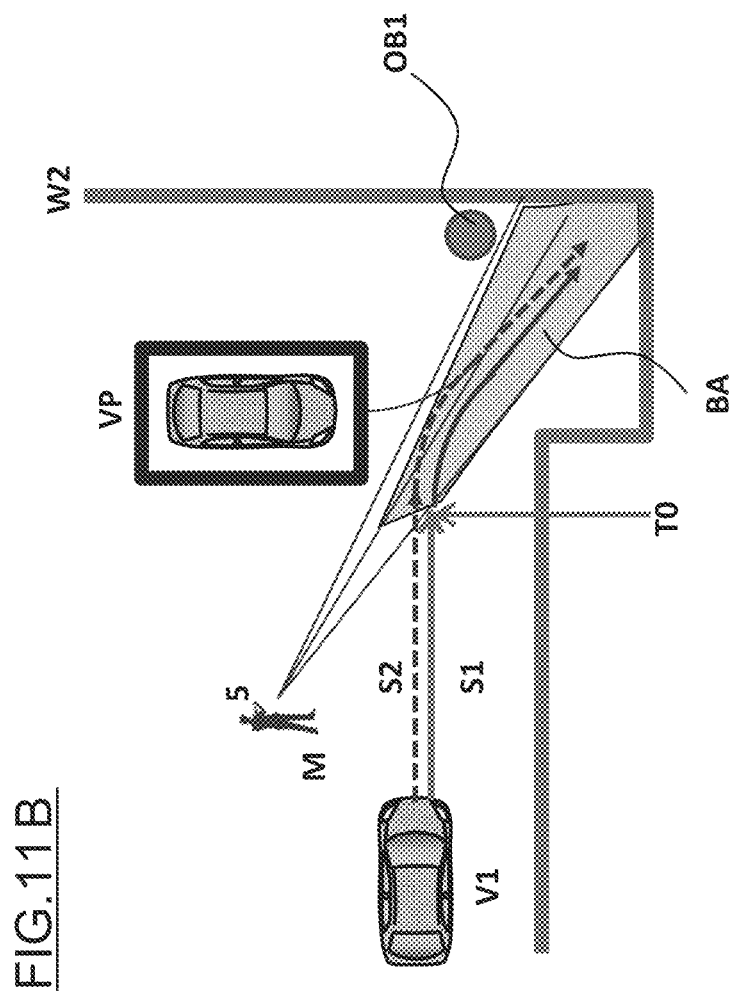
FIG. 11B is a second diagram for describing a setting scheme for the deceleration.

FIG. 11A and FIG. 11B each illustrate a parking route RT that passes through the first area VA and the second area BA. FIG. 11A illustrates a state in which an obstacle OB2 exists ahead of the vehicle V2 located at the position of turn for parking. The obstacle OB2 belongs to the second area VA. FIG. 11B illustrates a state in which an obstacle OB1 belonging to the first area VA exists ahead of the vehicle V2 located at the position of turn for parking.

In step 152, the control device 10 sets first deceleration S1 and second deceleration S2. The first deceleration S1 is deceleration when approaching the obstacle OB1, and the second deceleration S2 is deceleration when approaching the obstacle OB2. The deceleration includes the speed at the time of deceleration or the acceleration at the time of deceleration. The control device 10 calculates the control instruction such that the first deceleration S1 is a higher value than the second deceleration S2. In the situation of FIG. 11A, the control instruction is generated in which the second deceleration S2 (<S1) is set, and in the situation of FIG. 11B, the control instruction is generated in which the first deceleration S1 (>S2) is set. First deceleration m1 and second deceleration m2 are illustrated in the previously described FIG. 9E. FIG. 9E illustrates the temporal change of the speed in the control instruction. The control instruction when traveling in the first area is indicated by a solid line and the control instruction when traveling in the second area (blind area) is indicated by a broken line. As illustrated in the figure, the first deceleration m1 in the first area is larger than the second deceleration m2 in the second area.

The control device 10 controls the vehicle to move along the parking route in accordance with the calculated control instruction. By making the first deceleration higher than the second deceleration, the time for passing through the first area can be shortened. As a result, the time required from the parking start to the parking completion can be shortened. When only the first area is detected, a control instruction for the parking control process including the first deceleration S1 is generated.

From the same viewpoint, a relative speed limit value of the vehicle V to the operator can be set. The relative speed limit value is a value that defines a limit on the relative speed between the vehicle and the operator. The control device 10 sets a first relative speed limit value of the vehicle in the first area and a second relative speed limit value of the vehicle in the second area. This process can be performed together with or instead of the above-described step 142 in FIG. 8. By making the first relative speed limit value higher than the second relative speed limit value, the time for passing through the first area can be shortened. As a result, the time required from the parking start to the parking completion can be shortened.

The calculation scheme for the parking route RT of the vehicle will then be described.

The control device 10 calculates the parking route RT such that at least a part of the vehicle V exists in the first area VA along at least a part of the parking route RT of the vehicle. The control device 10 calculates the parking route RT such that a part of the vehicle V can be seen from the observation position at least temporarily while the vehicle V is moving along the parking route RT. This allows the operator to confirm the presence and position of the vehicle V during the parking control process. It is possible to avoid a situation in which the parking route RT is calculated such that the operator cannot confirm the presence and position of the vehicle V during the parking control process.

The parking route RT may be calculated such that the length of a route along which at least a part of the vehicle V exists in the first area VA has a predetermined ratio with respect to the entire length of the parking route RT. The predetermined ratio is preferably high (close to 1 (one)), but may be set in consideration of the balance with the possibility that the parking route RT can be calculated. For example, a parking route having the highest ratio may be selected from among parking routes RT that can be calculated within a range in which the number of turns for parking does not increase.

In one or more embodiments of the present invention, when at least a part of the parking route RT belongs to the second area BA (blind area), the parking route RT is calculated such that at least a part of the vehicle V exists in the first area VA.

Figure 12:
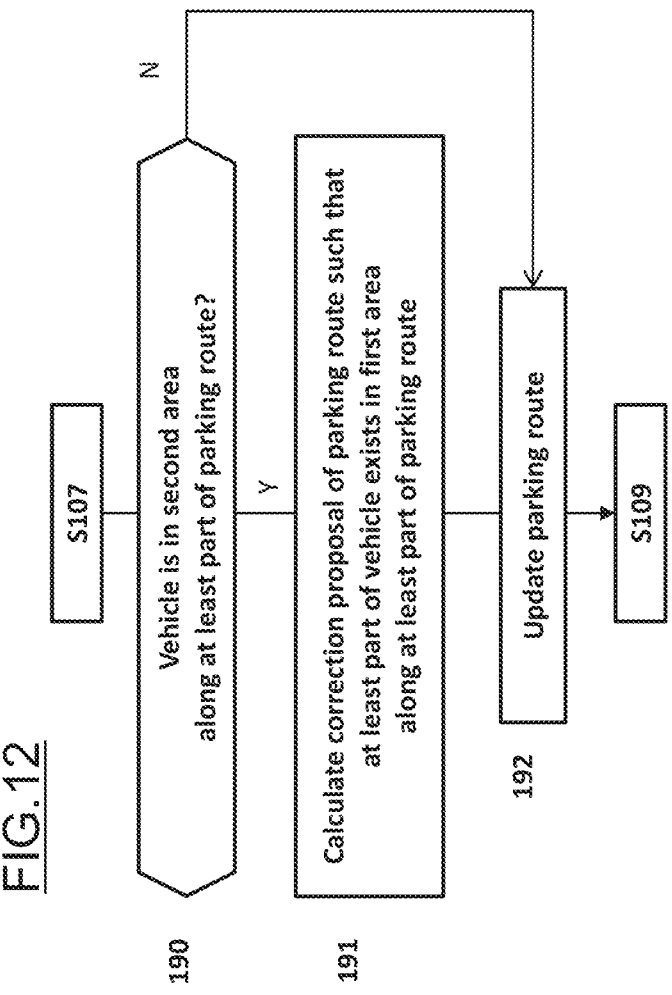
FIG. 12 is a flowchart illustrating a first example of a calculation scheme for a parking route.
Figure 13A:
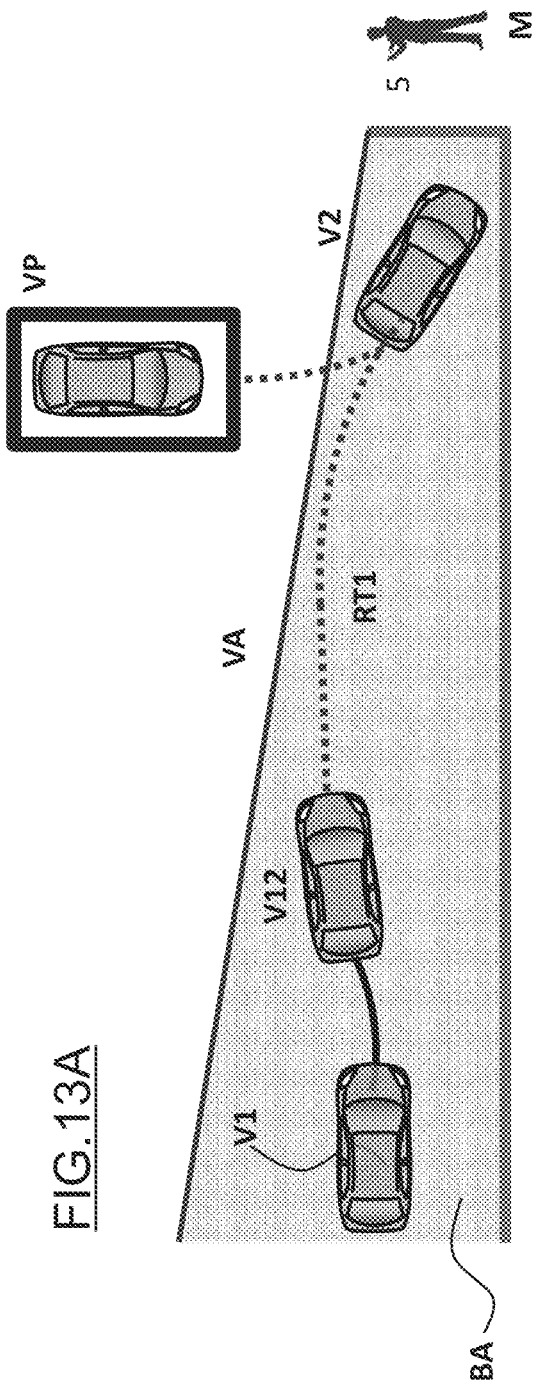
FIG. 13A is a first diagram for describing the first example of the calculation scheme for a parking route.

In step 190 of FIG. 12, the control device 10 determines whether or not at least a part of a provisionally calculated parking route RT is included in the second area BA. FIG. 13A illustrates an example of the case in which whole of the provisionally calculated parking route RT1 is included in the second area BA. Another case may also be possible in which a part of the parking route RT1 belongs to the second area BA. In step 191, the parking route RT is calculated as a correction proposal such that a part of the vehicle V exists in the first area VA along at least a part of the parking route RT1. When a new parking route can be adopted, the parking route is updated in step 192. In the example illustrated in FIG. 13B, a parking route RT2 is newly calculated as the correction proposal in which the left-side front portion V121 of the vehicle V12 moving belongs to the first area VA. In this parking route RT2, the left-side rear portion V21 of the vehicle V2 located at the position of turn for parking belongs to the first area VA. When the parking route RT2 of the correction proposal can be generated up to a target parking position VP without interfering with obstacles (including parked vehicles), the parking route RT2 is employed as substitute for the provisionally calculated parking route RT1.

The parking route RT is corrected when at least a part of the parking route RT belongs to the second area BA, and the parking control process can therefore be executed along the parking route RT which the operator can readily observe. When parking by remote operation, the operator can readily confirm the position and movement of the vehicle V.

In one or more embodiments of the present invention, the parking route RT is calculated such that at least a part of the vehicle V exists in the first area VA when located at the position of turn for parking which is included in the parking route RT.

Figure 14:
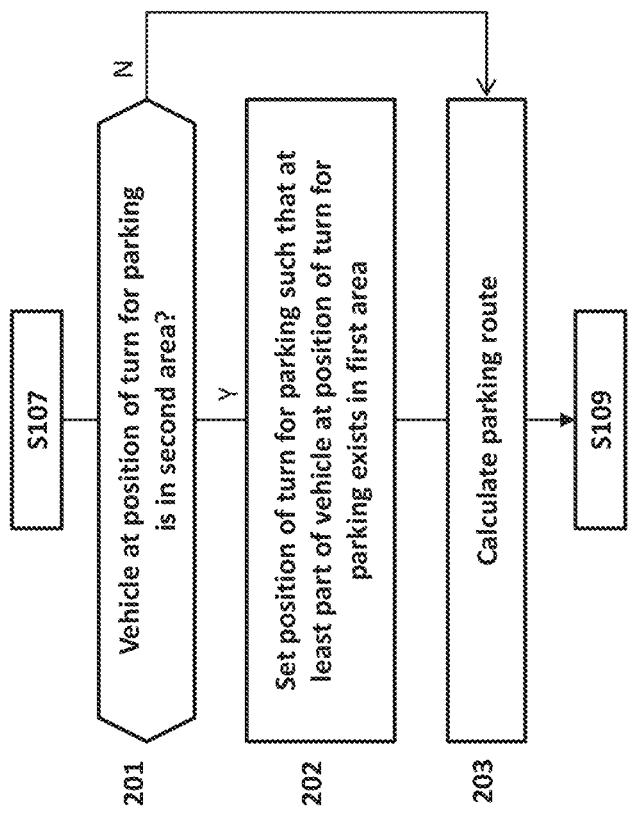
FIG. 14 is a flowchart illustrating a second example of a calculation scheme for a parking route.

In step 201 of FIG. 14, the control device 10 determines whether or not the vehicle V is in the second area when located at the position of turn for parking which is included in the parking route RT. It is highly possible that the position of turn for parking is a position at which the vehicle V is farthest from the operator and thus difficult to observe. Direction change is performed at the position of turn for parking, so the operator tends to pay the most attention.

The control device 10 calculates the parking route RT which allows the operator to readily observe the vehicle V located at the position of turn for parking. In step 202, the control device 10 sets the position of turn for parking such that at least a part of the vehicle exists in the first area VA when located at the position of turn for parking. In step 203, a route including the position of turn for parking is calculated.

Figure 15A:
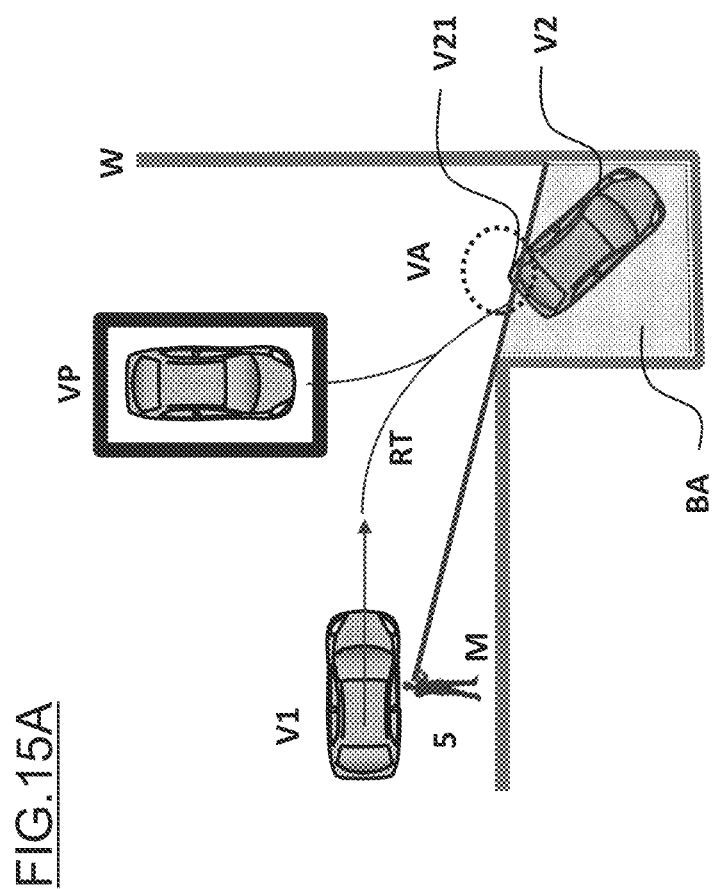
FIG. 15A is a first diagram for describing the second example of the calculation scheme for a parking route.

In the example illustrated in FIG. 15A, most of the vehicle V2 located at the position of turn for parking is included in the second area BA. Even in such a case, the parking route RT is calculated such that the left-side rear portion V21 which is at least a part of the vehicle V belongs to the first area VA. At least a part of the vehicle V existing in the observable first area VA allows the operator to perform the parking operation while estimating the position of the vehicle V. If the vehicle V cannot be seen at all, the position of the vehicle V cannot even be estimated, so it will be difficult to continue the parking operation. In contrast, the above scheme can ensure the possibility that the parking operation can be executed.

Figure 15B:
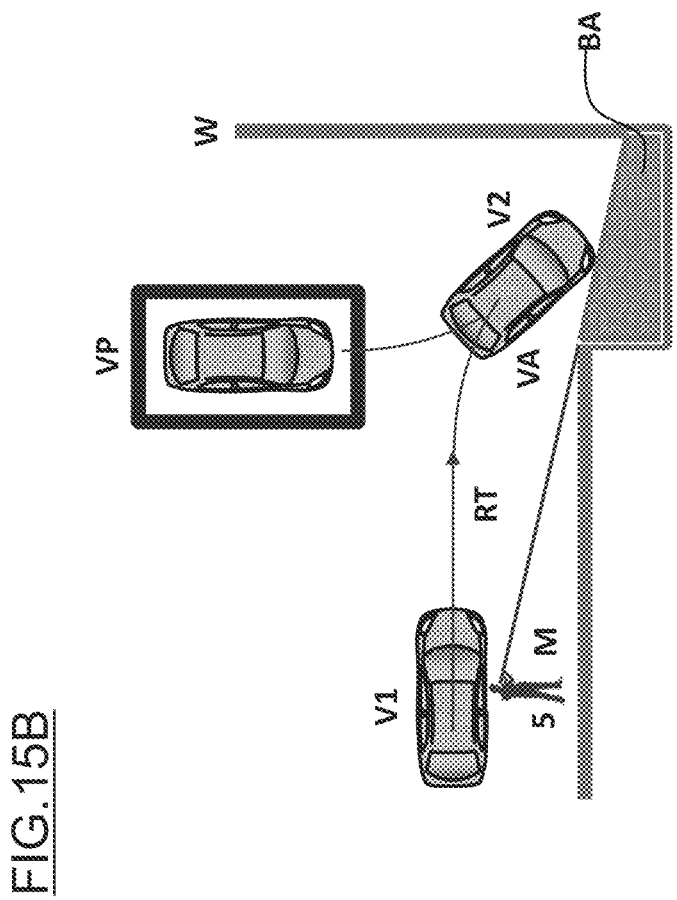
FIG. 15B is a second diagram for describing the second example of the calculation scheme for a parking route.

As will be understood, as illustrated in FIG. 15B, the parking route RT may be calculated such that whole of the vehicle belongs to the first area VA, that is, the second area BA does not include any part of the vehicle V.

The control device 10 may calculate the parking route RT such that a specific portion of the vehicle V exists in the first area VA. As illustrated in FIG. 15C, the control device 10 calculates the parking route RT such that the side mirror portion belongs to the first area VA because such a side mirror portion has a high possibility of contact with an obstacle. The specific portion can be a portion protruding outward in the outer body of the vehicle V and thus having a high possibility of coming close to an obstacle. The specific portion can be a side mirror portion as described above, a bicycle hanger provided at the rear portion of the vehicle, a spare tire holder, or other similar portion. This allows the operator to park by remote operation while observing the specific portion to be paid attention to.

Figure 15D:
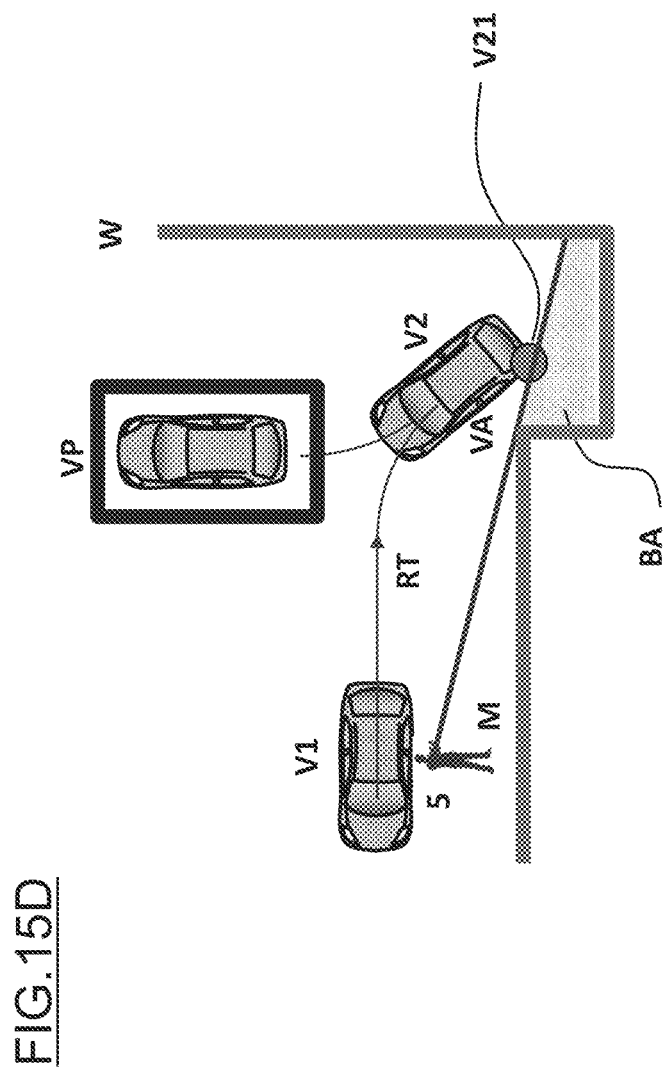
FIG. 15D is a fourth diagram for describing the second example of the calculation scheme for a parking route.

The control device 10 may preliminarily define the specific portion, which is included in the first area VA, of the vehicle V in accordance with a parking form. As illustrated in FIG. 15D, when the vehicle is moved back and then parked forward into a parking space, the control device 10 defines the right or left rear portion (corner portion) as the specific portion. When a right turn is performed, the right-side front portion or mirror portion or a right-side rear portion can be defined as the specific portion. When a left turn is performed, the left-side front portion or mirror portion or a left-side rear portion can be defined as the specific portion. That is, in the case of a right turn in forward parking, the right-side mirror portion can be set as the specific portion. When performing reverse parking, the control device 10 calculates the parking route RT such that the right or left rear portion belongs to the first area VA. This allows the operator to park by remote operation while observing the specific portion to be paid attention to.

Figure 15E:
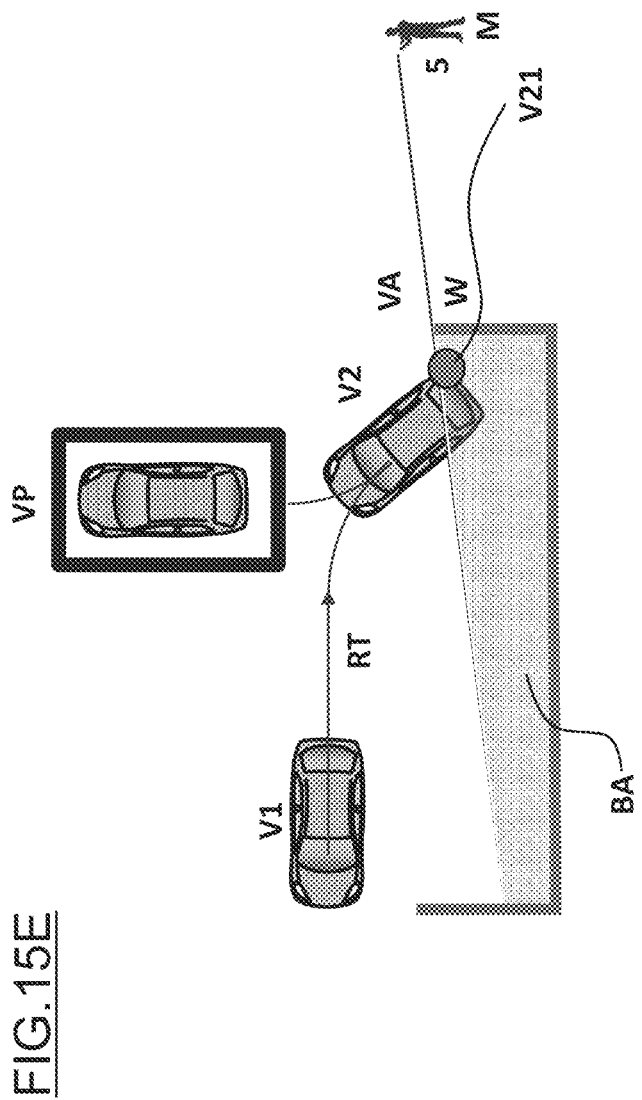
FIG. 15E is a fifth diagram for describing the second example of the calculation scheme for a parking route.

The control device 10 may calculate the parking route such that at least a part of the vehicle V exists in the first area when the distance between the vehicle V and an obstacle detected around the vehicle is less than a predetermined value. As illustrated in FIG. 15E, provided that the vehicle V moves along a provisionally calculated parking route RT, the control device 10 calculates the parking route RT such that the right-side rear portion V21, which is at least a part of the vehicle V, belongs to the first area VA when a determination is made that the distance between the wall W of the parking lot as an obstacle and the vehicle V is less than the predetermined value. The control device 10 may calculate the parking route RT such that a portion of the vehicle V that is closest to an obstacle belongs to the first area VA. In this example, the obstacle which the vehicle V comes closest to is the wall W of the parking lot, and the parking route RT is therefore calculated such that the right-side rear portion V21 of the vehicle, which comes closest to the wall W, belongs to the first area VA. This allows the operator to park by remote operation while observing the portion to be paid attention to in accordance with the positional relationship between the vehicle V and the obstacle.

When the vehicle V and an obstacle come close to each other, the position of the vehicle V is made observable by setting the parking route RT (an occupied area at the time of parking) such that a part of the vehicle V exists in the first area VA. This allows the vehicle V and the obstacle to come close to each other. The situation in which the parking route RT cannot be calculated due to coming close to the obstacle is prevented, thereby increasing the possibility that the parking control process for the vehicle V is executed.

When a part of the parking route belongs to the second area, the control device 10 sets the parking route RT such that a part of the parking route is in the first area. In this case, a second target speed when traveling along a parking route RT2 belonging to the second area BA is set lower than a first target speed when traveling along a parking route RT1 belonging to the first area VA.

As illustrated in FIG. 16, when a determination is made in step 301 that the parking route belongs to the second area BA, the process proceeds to step 302 to further determine whether or not the parking route can be set in the first area VA. When whole of the parking route can be set in the first area VA, the parking route is calculated in step 303. When a part of the parking route belongs to the second area BA, the target speed on the parking route belonging to the second area is changed relatively low.

As illustrated in FIG. 17, when a part of the parking route belongs to the second area BA and another part belongs to the first area VA, the target speed of the vehicle V when traveling along a parking route RT2 (indicated by a solid line) belonging to the second area BA is lower than the target speed of the vehicle V when traveling along a parking route RT1 (indicated by a broken line) belonging to the first area VA. In the second area BA which cannot be observed by visual recognition, the speed of the vehicle V is lowered and the operator can therefore carefully observe the movement of the vehicle V.

When the angle between the direction of the vehicle V with reference to the observation position and the direction of at least a part of the parking route RT is less than a predetermined angle, the control device 10 may change the position of turn for parking TP thereby to change the direction of the parking route TP. The direction of the parking route RT is changed by shifting the position of turn for parking to the downstream side (traveling direction side).

Figure 18:
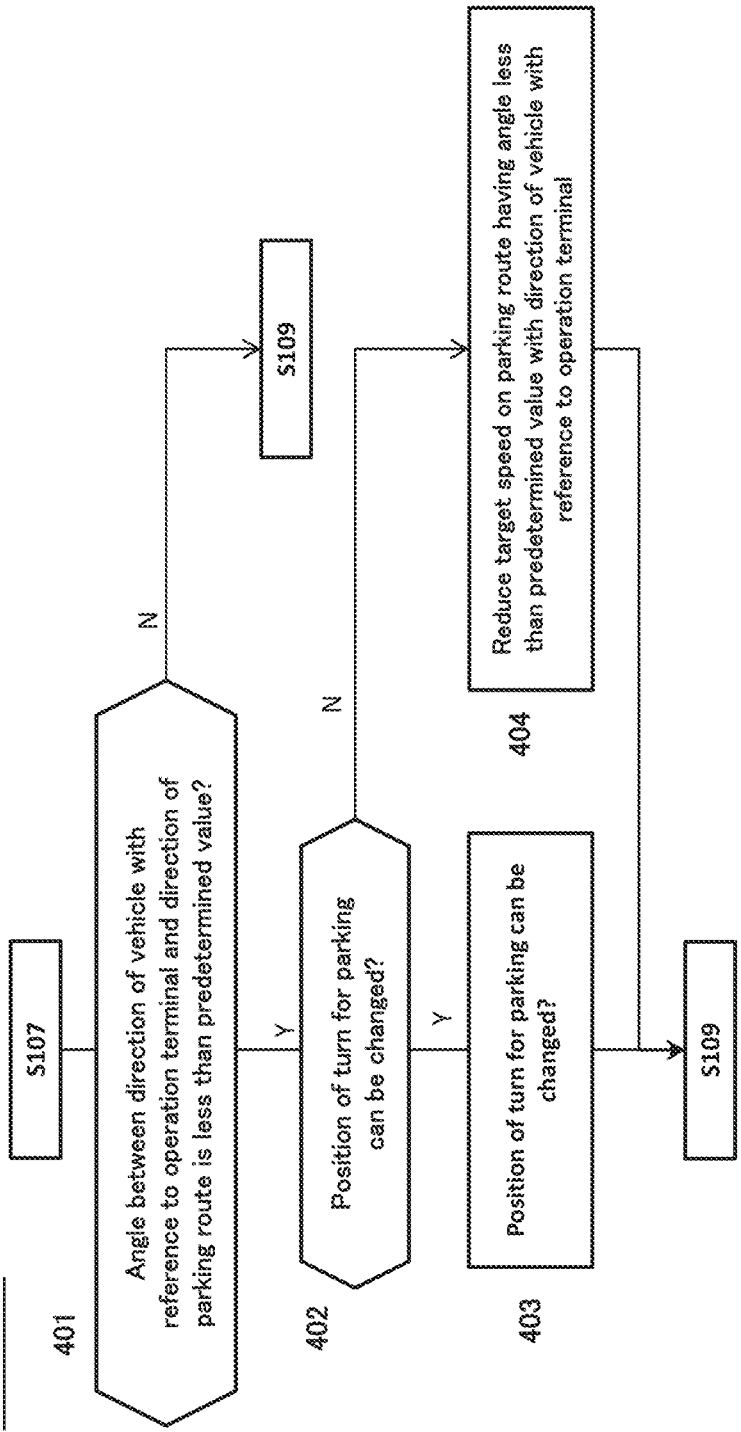
FIG. 18 is a flowchart illustrating a fourth example of a calculation scheme for a parking route.

As illustrated in FIG. 18, a determination is made in step 401 as to whether or not the angle between the direction of the vehicle V with reference to the observation position and the direction of at least a part of the parking route RT is less than the predetermined angle. An affirmative determination is followed by step 402, in which a determination is made as to whether or not the position of turn for parking TP can be changed. When the position of turn for parking can be changed, the process proceeds to step 403 to calculate a parking route based on the changed position of turn for parking. When the position of turn for parking cannot be changed due to interference with other obstacles, etc., the process proceeds to step 404 to reduce the target speed on the parking route having an angle less than the predetermined angle with the direction connecting between the observation position (operator M or operation terminal 5) and the vehicle V.

Figure 19A:
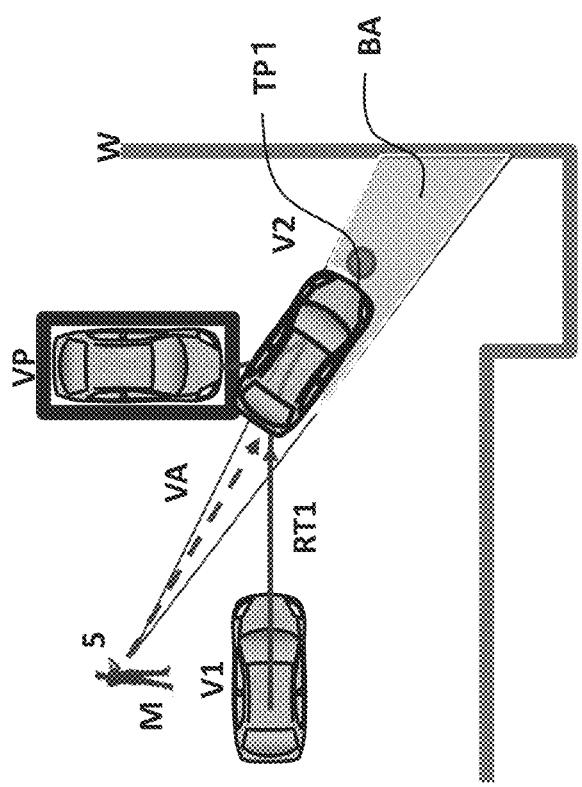
FIG. 19A is a first diagram for describing the fourth example of the calculation scheme for a parking route.
Figure 19B:
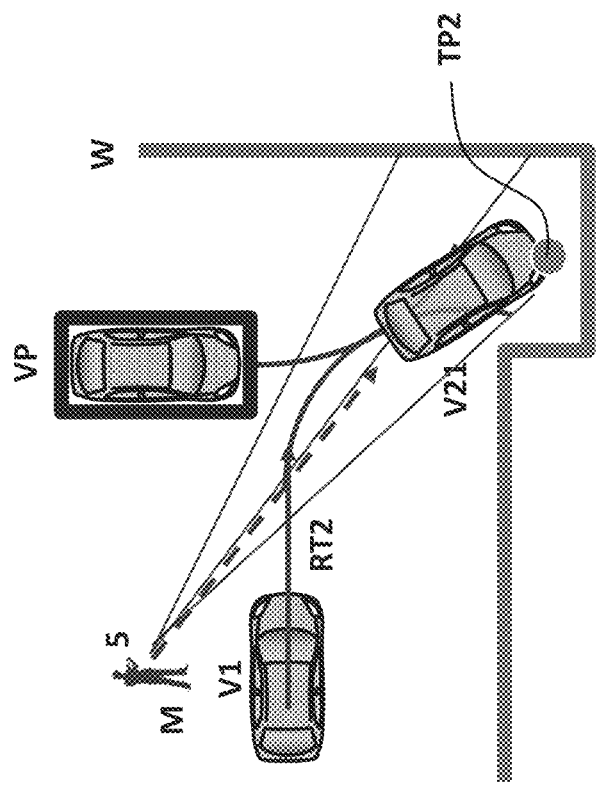
FIG. 19B is a second diagram for describing the fourth example of the calculation scheme for a parking route.

FIG. 19A illustrates the case in which the angle between the direction of the vehicle V with reference to the observation position and the direction of at least a part of the parking route RT is less than the predetermined angle. As illustrated in FIG. 19A, in such a case, the second area BA (blind area) is formed due to the vehicle V to be controlled. The control device 10 shifts the position of turn for parking TP1 to a position of turn for parking TP2 on the downstream side in the traveling direction, that is, on the farther side of the recessed part formed due to the wall W in the figure. Through this operation, the angle of the parking route RT can be changed. The angle between the direction of the vehicle V with reference to the observation position illustrated in FIG. 19B and the direction of the parking route RT2 is relatively larger than that in FIG. 19A; therefore, the time during which the second area BA is caused due to the vehicle V is shortened, and the area of the second area BA is also reduced.

The moving direction of the vehicle V and the line-of-sight direction of the operator can be shifted from each other by changing the position of turn for parking, and it is thus possible to prevent the second area BA from being caused due to the vehicle V to be controlled.

When the angle between the direction of the vehicle V with reference to the observation position and the direction of at least a part of the parking route RT is less than a predetermined angle, the control device 10 may change the angle/curvature of the parking route RT thereby to change the direction of the parking route RT.

Figure 20:
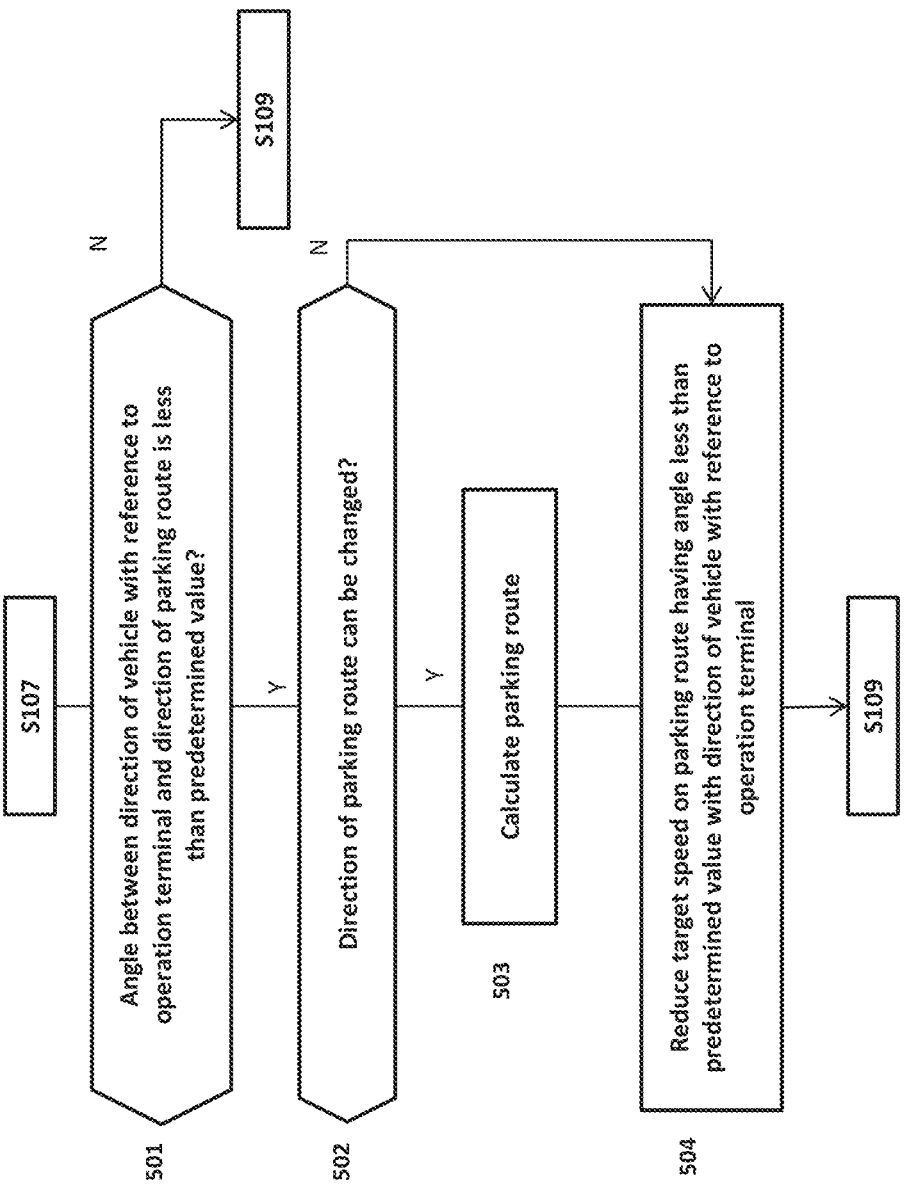
FIG. 20 is a flowchart illustrating a fifth example of a calculation scheme for a parking route.

As illustrated in FIG. 20, a determination is made in step 501 as to whether or not the angle between the direction of the vehicle V with reference to the observation position and the direction of at least a part of the parking route RT is less than the predetermined angle. An affirmative determination is followed by step 502, in which a determination is made as to whether or not the direction of the parking route RT can be changed. When the direction of the parking route RT can be changed, the process proceeds to step 503 to calculate a parking route based on the changed angle/curvature. Even when the new parking route RT is calculated, there may remain a portion in which the angle between the direction of the vehicle V with reference to the observation position and the direction of at least a part of the parking route RT is less than the predetermined angle. In this case, the process proceeds to step 504 to reduce the target speed on the parking route having an angle less than the predetermined angle with the direction connecting between the operator M and the vehicle V. Also in step 502, when the angle/curvature of the parking route cannot be changed due to interference with other obstacles, etc., the process proceeds to step 504 to reduce the target speed on the parking route having an angle less than the predetermined angle with the direction connecting between the operator M and the vehicle V.

Figure 21A:
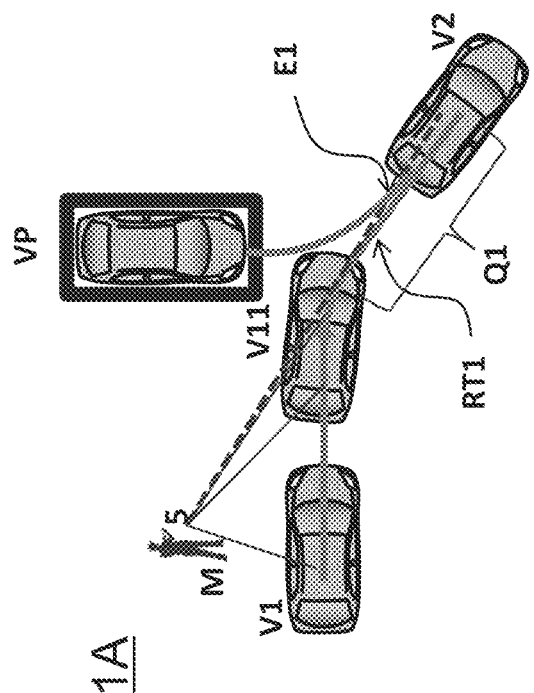
FIG. 21A is a first diagram for describing the fifth example of the calculation scheme for a parking route.
Figure 21B:
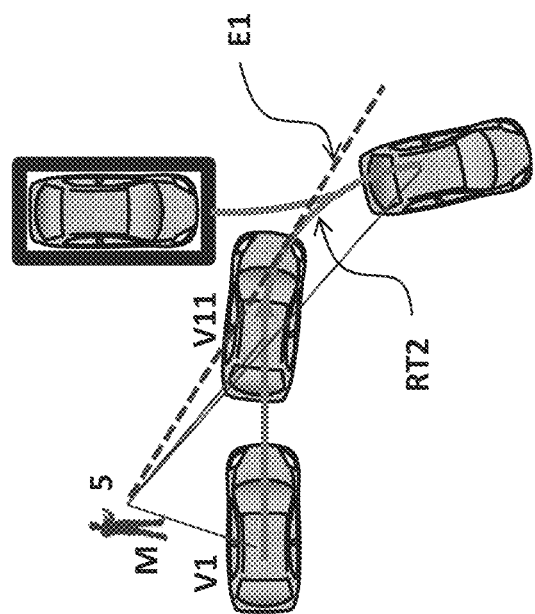
FIG. 21B is a second diagram for describing the fifth example of the calculation scheme for a parking route.

FIG. 21A illustrates the case where an area Q1 exists in which the angle between the direction of the vehicle V with reference to the observation position and the direction of at least a part of the parking route RT is less than the predetermined angle. As previously described, in such a case, the second area BA (blind area) is formed due to the vehicle V to be controlled. As illustrated in FIG. 21B, the curvature of the parking route RT2 is changed thereby to increase the angle between the direction of the vehicle V with reference to the observation position and the direction of the parking route RT2, and the time during which the second area BA is caused due to the vehicle V (the time for passing through the area Q1 illustrated in FIG. 21A) is thus shortened.

The moving direction of the vehicle V and the line-of-sight direction of the operator can be shifted from each other by changing the angle/curvature of the parking route RT, and it is thus possible to prevent the second area BA from being caused due to the vehicle V to be controlled.

In step 504 of FIG. 20, the target speed on the parking route RT having an angle less than the predetermined angle with the direction connecting between the observation position and the vehicle V is lowered. This can reduce the target speed on the parking route RT included in the second area caused due to the vehicle V. As illustrated in FIG. 21C, the target speed on a parking route RT3 included in the second area BA can be lowered. As will be understood, the same process is performed when the parking route RT cannot be updated ("No" in step 502). In the second area BA which cannot be observed by visual recognition, the speed of the vehicle V is lowered and the operator can therefore carefully observe the movement of the vehicle V.

When the area of the second area unobservable from a first observation position that is set on the basis of the position of the operator M is larger than the area of the second area unobservable from a second observation position different from the first observation position, the control device 10 transmits the second observation position to the operation terminal 5.

To move the position of the operator M, a new second operating position is presented thereby to encourage the operator M to move. Alternatively, an instruction to change the observation position may be given to the operator M via the operation terminal 5.

Figure 22:
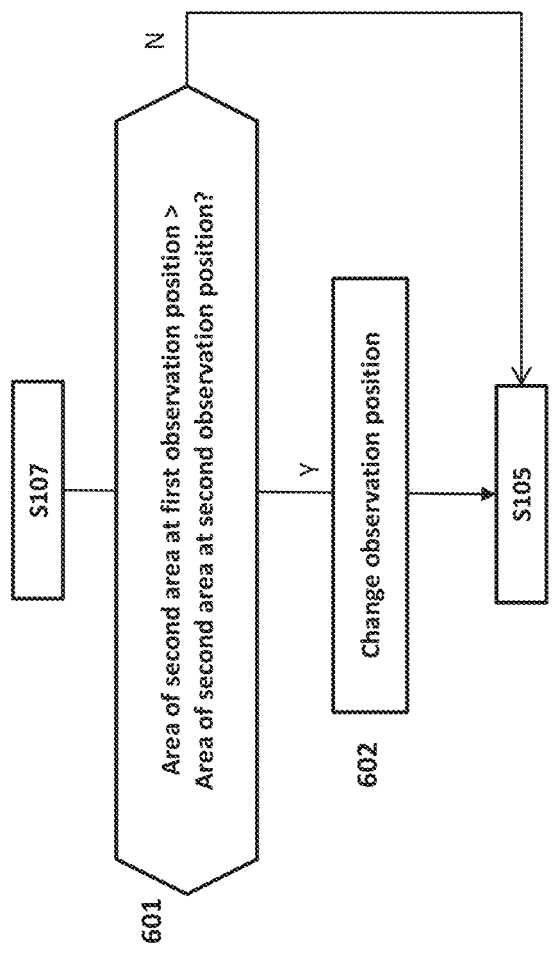
FIG. 22 is a flowchart illustrating a sixth example of a calculation scheme for a parking route.
Figure 23A:
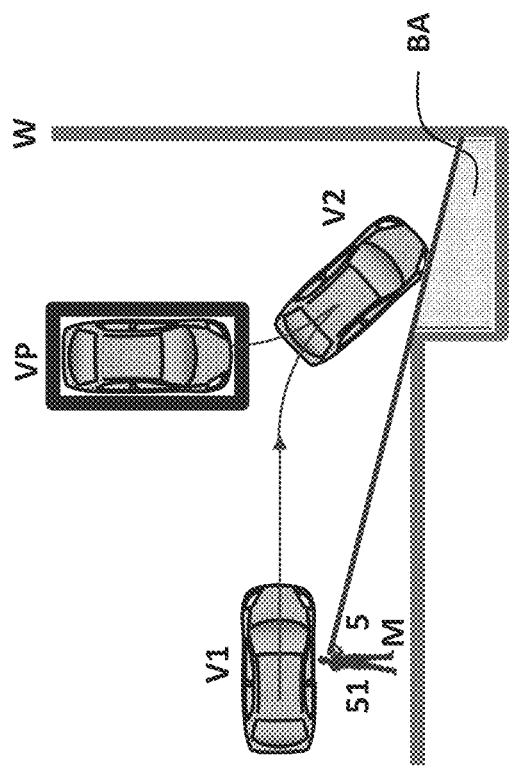
FIG. 23A is a first diagram for describing the sixth example of the calculation scheme for a parking route.
Figure 23B:
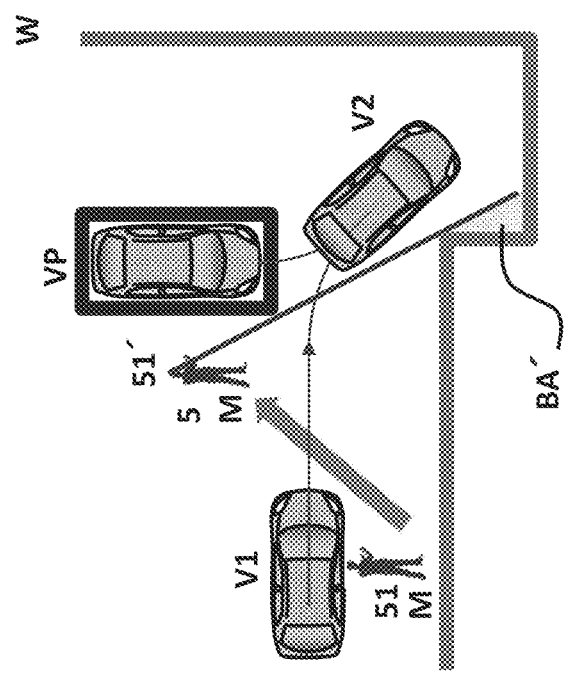
FIG. 23B is a second diagram for describing the sixth example of the calculation scheme for a parking route.
Figure 23C:
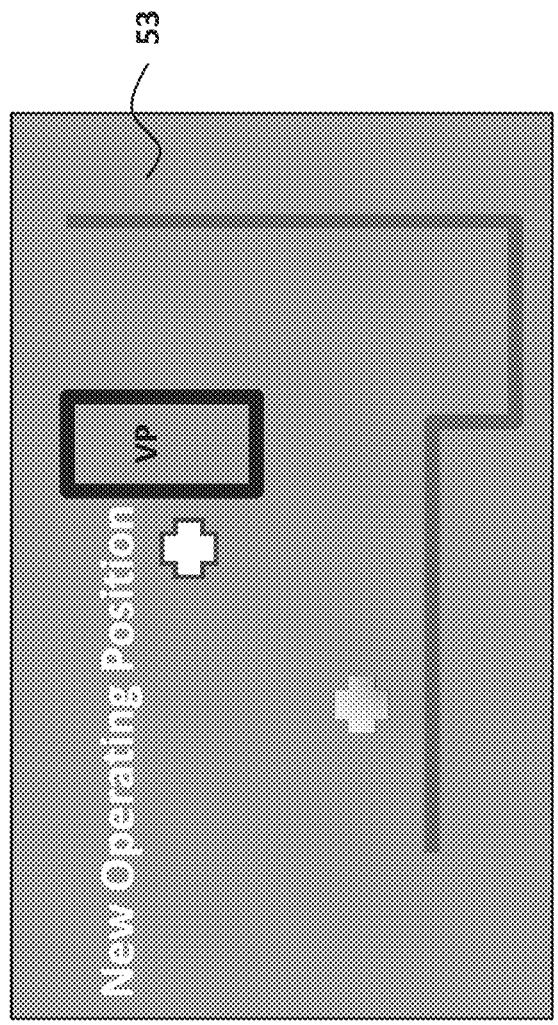
FIG. 23C is a diagram illustrating a presentation example of an operating position.

In step 601 of FIG. 22, when the area of the second area calculated at the first observation position is larger than the area of the second area calculated at the second observation position, the process proceeds to step 602, in which the control device 10 changes the observation position. The area of a second area BA' that is calculated on the basis of a second observation position 51' illustrated in FIG. 23B and that cannot be visually recognized from the operator M due to an obstacle (wall W) is smaller than the area of a second area BA that is calculated on the basis of a first observation position 51 illustrated in FIG. 23A and that cannot be visually recognized from the operator M due to the obstacle (wall W). In such a case, the position of the operator M serving as a reference of the observation position is changed. Information for requesting the operator M to move is provided via the operation terminal 5 because the operation terminal 5 is carried by the operator M. For example, as illustrated in FIG. 23C, the new second operating position is presented thereby to encourage the operator M to move. This can reduce the unobservable second area and the vehicle V can be parked along the parking route which the operator M can readily perceive.

In step 108, the control device 10 generates a control instruction for moving the vehicle V along the calculated parking route. The control device 10 preliminarily stores the spec information of the vehicle necessary for the control instruction. Examples of the control instruction include instructions for the steering amount, steering speed, steering acceleration, shift position, speed (including zero), acceleration, and deceleration of the vehicle, which are associated with the timing or position when the vehicle travels along the parking route, and other operation instructions. The instruction regarding the parking route and the operation instruction associated with the parking route are executed by the vehicle, and the vehicle can thereby be moved (parked) into the target parking space.

Referring again to FIG. 5, the process after step 109 will be described. The parking control apparatus 100 according to one or more embodiments of the present invention operates to execute the parking control process by remote control through transmitting a target parking space setting command, a parking control process start command, a parking interruption/cancellation command, and other appropriate commands from the external to the vehicle V1 without requiring the operator to get on the vehicle V1. In step 109, the control device 10 controls the display 53 of the operation terminal 5 to present the parking route. In step 110, when the operator confirms the parking route and inputs an execution instruction, the process proceeds to step 111. The operation terminal 5 transmits the execution command input by the operator to the parking control apparatus 100 of the vehicle V. The parking control apparatus 100 of the vehicle V starts the parking control.

In step 112, the control device 10 periodically calculates the first area (and/or the second area). The first area recognizable from the observation position and the second area unrecognizable from the observation position vary in accordance with the changes in the position of an obstacle and the position of the vehicle V. To respond to the change in the situation, the control device 10 calculates the first area (or the second area) at a predetermined cycle. In step 113, the control device 10 determines whether or not there is a change in the first area or the second area. When there is a change, the parking route is calculated again because the positional relationship between the position of the parking route (including the position of turn for parking) and the second area also changes. When an appropriate new parking route can be calculated, the new parking route is adopted. The control device 10 calculates a control instruction for the new parking route. In step 114, the control device 10 updates the parking route and control instruction calculated in step 108 to the new parking route and control instruction corresponding to the first area or the second area which has changed over time. When there is not any change in the first area or the second area in step 113, it is not necessary to calculate a new parking route and control instruction, and the process proceeds to step 115.

In step 115, the control device 10 monitors the changes in the first area and the second area until the vehicle V reaches the position of turn for parking. When the vehicle reaches the position of turn for parking, the gear shift included in the control instruction is executed in step 116. Step 116 is followed by step 117, in which the parking control is completed by sequentially executing control instructions.

The parking control apparatus 100 according to one or more embodiments of the present invention controls the operation of the drive system 40 via the vehicle controller 30 in accordance with the control instruction so that the vehicle V1 moves along the parking route. The parking control apparatus 100 calculates command signals to the drive system 40 of the vehicle V1, such as an EPS motor, while feeding back the output value of the steering angle sensor 50 of the steering apparatus so that the travel trajectory of the vehicle V1 coincides with the calculated parking route, and transmits the command signals to the drive system 40 or to the vehicle controller 70 which controls the drive system 40.

The parking control apparatus 100 according to one or more embodiments of the present invention includes a parking control unit. The parking control unit acquires shift range information from an AT/CVT control unit, wheel speed information from an ABS control unit, steering angle information from a steering angle control unit, engine speed information from an ECM, and other necessary information. On the basis thereof, the parking control unit calculates and outputs instruction information on the automated or autonomous steering to the EPS control unit, instruction information such as warning to a meter control unit, etc. The control device 10 acquires information items, which are acquired by the steering angle sensor 50 of the steering apparatus of the vehicle V1 and the vehicle speed sensor 60 and other sensors of the vehicle, via the vehicle controller 70.

The drive system 40 according to one or more embodiments of the present invention controls the vehicle V1 to move (travel) from the current position to the target parking space by driving based on the control instruction signals acquired from the parking control apparatus 100. The steering apparatus according to one or more embodiments of the present invention is a drive mechanism that moves the vehicle V in the right and left directions. The EPS motor included in the drive system 40 drives the power steering mechanism of the steering of the steering apparatus on the basis of the control instruction signals acquired from the parking control apparatus 100 to control the steering amount and controls the operation when moving the vehicle V1 to the target parking space. The control content and operation scheme for parking of the vehicle V1 are not particularly limited, and any scheme known at the time of filing of this application can be appropriately applied.

When the parking control apparatus 100 according to one or more embodiments of the present invention controls the vehicle V1 to move to the target parking space along the route calculated on the basis of the position of the vehicle V1 and the position of the target parking space, the accelerator and the brake are controlled in an automated or autonomous manner on the basis of the specified control vehicle speed (set vehicle speed), and the operation of the steering apparatus controls the movement of the vehicle in an automated or autonomous manner in accordance with the vehicle speed.

The parking control method according to one or more embodiments of the present invention is used in the parking control apparatus as the above and therefore has the following effects. The parking control apparatus 100 according to one or more embodiments of the present invention is configured and operates as the above and therefore has the following effects.

(1) The parking control method according to one or more embodiments of the present invention includes calculating the first area observable from the operator and the second area unobservable from the observation position on the basis of the positional relationship between the position of the obstacle and the position of the operator and calculating the parking route and the control instruction for moving along the parking route such that the first proximity level of the vehicle to the obstacle in the first area is higher than the second proximity level of the vehicle to the obstacle in the second area.

In one or more embodiments of the present invention, the first proximity level in the first area observable from the observation position of the operator is set higher than the second proximity level in the second area unobservable from the observation position of the observer. In the area observable by the operator M, the vehicle and the obstacle are allowed to come closer to each other than in the area unobservable by the operator M. The proximity level between the vehicle and the obstacle can thus be adjusted in accordance with the observation situation of the operator M.

In the first area observable by the operator, the vehicle is moved while coming closer to the obstacle than in the second area; therefore, even though the obstacle exists, the parking control can be continued. The parking control process is not interrupted without exception due to the existence of the obstacle because, depending on the situation, the vehicle and the obstacle are allowed to come close to each other. According to the parking control method in one or more embodiments of the present invention, the first proximity level applied in the first area is changed to a value that is relatively higher than the second proximity level applied in the second area; therefore, the number of scenes in which the parking control process is continued increases, and both the comfort and usability and the safety can be achieved.

(2) In the parking control method according to one or more embodiments of the present invention, the first proximity level is represented by a first margin distance that allows the vehicle to come close to the obstacle, and the second proximity level is represented by a second margin distance that allows the vehicle to come close to the obstacle. The parking route is calculated such that the first margin distance is shorter than the second margin distance; therefore, the parking control process can be continued while allowing the vehicle V and the obstacle to come close to each other in the first area VA.

(3) In the parking control method according to one or more embodiments of the present invention, the first proximity level is represented by a first turning distance between a first position of turn belonging to the first area and the obstacle, and the second proximity level is represented by a second turning distance between a second position of turn belonging to the second area and the obstacle. The parking route is calculated such that the first turning distance is shorter than the second turning distance; therefore, the parking control process can be continued while allowing the first position of turn and the obstacle to come relatively close to each other in the first area VA.

(4) In the parking control method according to one or more embodiments of the present invention, the first proximity level is represented by a first separation distance from the obstacle to the parking route, and the second proximity level is represented by a second separation distance from the obstacle to the parking route. The parking route is calculated such that the first separation distance is shorter than the second separation distance. When calculating the parking route, the condition is that each point on the parking route is separated from the obstacle by a predetermined distance. The first separation distance when the parking route exists in the first area is set shorter than the second separation distance when the parking route exists in the second area. This allows the parking route and the obstacle to come closer to each other in the first area VA than in the second area BA, and the parking control process can be continued.

(5) In the parking control method according to one or more embodiments of the present invention, the first proximity level is represented by first deceleration start timing at which deceleration is started when approaching the obstacle, and the second proximity level is represented by second deceleration start timing at which deceleration is started when approaching the obstacle. The control instruction is generated such that the first deceleration start timing is later timing than the second deceleration start timing. By making the first deceleration start timing later than the second deceleration start timing, the time for passing through the first area can be shortened. As a result, the time required from the parking start to the parking completion can be shortened.

(6) In the parking control method according to one or more embodiments of the present invention, the first proximity level is represented by a first deceleration completion distance from the obstacle to a first deceleration completion point in the first area, and the second proximity level is represented by a second deceleration completion distance from the obstacle to a second deceleration completion point in the second area. The control instruction is generated such that the first deceleration completion distance is shorter than the second deceleration completion distance. By making the first deceleration completion distance shorter than the second deceleration completion distance to allow the vehicle to come as close as possible to the obstacle, the vehicle can continue to move in the parking control.

(7) In the parking control method according to one or more embodiments of the present invention, the first proximity level is represented by first deceleration when approaching the obstacle, and the second proximity level is represented by second deceleration when approaching the obstacle. By making the first deceleration higher than the second deceleration, the time for passing through the first area can be shortened. As a result, the time required from the parking start to the parking completion can be shortened.

(8) The control instruction in the parking control method according to one or more embodiments of the present invention includes a first relative speed limit value between the vehicle belonging to the first area and the operator and a second relative speed limit value between the vehicle belonging to the second area and the operator, and the control instruction is generated such that the first relative speed limit value is higher than the second relative speed limit value. By making the first relative speed limit value higher than the second relative speed limit value, the time for passing through the first area can be shortened. As a result, the time required from the parking start to the parking completion can be shortened.

(9) In the parking control method according to one or more embodiments of the present invention, the parking route RT is calculated such that at least a part of the vehicle V exists in the first area VA along at least a part of the parking route RT of the vehicle. The control device 10 calculates the parking route RT such that a part of the vehicle V can be seen from the observation position at least temporarily while the vehicle V is moving along the parking route RT. This allows the operator to confirm the presence and position of the vehicle V during the parking control process. It is possible to avoid a situation in which the parking route RT is calculated such that the operator cannot confirm the presence and position of the vehicle V during the whole parking control process.

(10) In the parking control method according to one or more embodiments of the present invention, the parking route RT is calculated such that at least a part of the vehicle V exists in the first area VA when located at a position of turn for parking that is included in the parking route RT. Even when the position of turn for parking belongs to the second area (blind area) along the parking route RT which is calculated on the basis of a preliminarily set rule, the parking route RT is calculated such that the left-side rear portion V21 which is at least a part of the vehicle V belongs to the first area VA. At least a part of the vehicle V existing in the observable first area VA allows the operator to perform the parking operation while estimating the position of the vehicle V. If the vehicle V cannot be seen at all, the position of the vehicle V cannot even be estimated, so it will be difficult to continue the parking operation. In contrast, the above scheme can ensure the possibility that the parking operation can be executed.

(11) In the parking control method according to one or more embodiments of the present invention, the parking route RT is calculated such that a specific portion of the vehicle V exists in the first area VA. The control device 10 calculates the parking route RT such that the specific portion (e.g., the side mirror portion) for which attention is paid to contact belongs to the first area VA. This allows the operator to park by remote operation while observing the specific portion to be paid attention to.

(12) In the parking control method according to one or more embodiments of the present invention, the specific portion, which is included in the first area VA, of the vehicle V may be preliminarily defined in accordance with a parking form. For example, when performing reverse parking, the right or left rear portion (corner portion) is defined as the specific portion. When performing reverse parking, the control device 10 calculates the parking route RT such that the right or left rear portion belongs to the first area VA. This allows the operator to park by remote operation while observing the specific portion to be paid attention to.

(13) In the parking control method according to one or more embodiments of the present invention, the parking route is calculated such that at least a part of the vehicle V exists in the first area when the distance between the vehicle V and an obstacle detected around the vehicle is less than a predetermined value. This allows the operator to park by remote operation while observing the portion to be paid attention to in accordance with the positional relationship between the vehicle V and the obstacle.

(14) In the parking control method according to one or more embodiments of the present invention, when an angle between the direction of the vehicle V with reference to the position of the operator and the direction of at least a part of the parking route RT is less than a predetermined angle, the parking route RT is changed. The moving direction of the vehicle V and the line-of-sight direction of the operator can be shifted from each other by changing the position of turn for parking or changing the inclination and/or curvature of the parking route RT, and it is thus possible to prevent the second area BA from being caused due to the vehicle V to be controlled.

(15) In the parking control method according to one or more embodiments of the present invention, when at least a part of the parking route RT belongs to the second area BA (blind area), the parking route RT is calculated such that at least a part of the vehicle V exists in the first area VA. The parking route RT is corrected when at least a part of the parking route RT belongs to the second area BA, and the parking control process can therefore be executed along the parking route RT which the operator can readily observe. When parking by remote operation, the operator can readily confirm the position and movement of the vehicle V. The parking route RT is calculated such that the left-side rear portion V21 which is at least a part of the vehicle V belongs to the first area VA. At least a part of the vehicle V existing in the observable first area VA allows the operator to perform the parking operation while estimating the position of the vehicle V. If the vehicle V cannot be seen at all, the position of the vehicle V cannot even be estimated, so it will be difficult to continue the parking operation. In contrast, the above scheme can ensure the possibility that the parking operation can be executed.

(16) In the parking control method according to one or more embodiments of the present invention, when a part of the parking route belongs to the second area BA and another part belongs to the first area VA, the target speed of the vehicle V when traveling along a parking route RT2 (indicated by a solid line) belonging to the second area BA is lower than the target speed of the vehicle V when traveling along a parking route RT1 (indicated by a broken line) belonging to the first area VA. In the second area BA which cannot be observed by visual recognition, the speed of the vehicle V is lowered and the operator can therefore carefully observe the movement of the vehicle V.

(17) In the parking control method according to one or more embodiments of the present invention, when the area of the second area unobservable from a first observation position that is set on the basis of the position of the operator M is larger than the area of the second area unobservable from a second observation position different from the first observation position, the second observation position is transmitted to the operation terminal 5. The second area which is an unobservable blind area can be reduced, and the vehicle V can be parked along the parking route which the operator can readily perceive.

(18) In the parking control apparatus 100 in which the method according to one or more embodiments of the present invention is executed, the actions and effects as described in the above (1) to (17) can be obtained.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1000 Parking control system
100 Parking control apparatus
10 Control device
11 CPU
12 ROM
13 RAM
132 Storage device
133 Map information
134 Parking lot information
135 Obstacle information
20 Input device
21 Communication device
211 Antenna
30 Output device
Display
1*a*-1*d* Cameras
2 Ranging devices
3 Information server
31 Communication device
32 Storage device
33 Map information
34 Parking lot information
35 Obstacle information
5 Operation terminal
51 Communication device
511 Antenna
52 Input device
53 Display 200 Onboard device
40 Drive system
50 Steering angle sensor
60 Vehicle speed sensor
70 Vehicle controller
V Vehicle
VA First area
BA Second area

The invention claimed is:

1. A parking control method for parking a vehicle on a basis of an operation command acquired from an operator outside the vehicle, the parking control method comprising:
detecting a position of the operator;
detecting a position of an obstacle existing around the vehicle;
calculating a first area observable from the operator and a second area other than the first area and unobservable from the operator on a basis of a positional relationship between the position of the obstacle and the position of the operator;
calculating a parking route and a control instruction for moving along the parking route such that a first proximity level of the vehicle to the obstacle in the first area is higher than a second proximity level of the vehicle to the obstacle in the second area; and
parking the vehicle in accordance with the control instruction.

2. The parking control method according to claim 1, wherein
the first proximity level is represented by a first margin distance that allows the vehicle to come close to the obstacle,
the second proximity level is represented by a second margin distance that allows the vehicle to come close to the obstacle, and
the parking route is calculated such that the first margin distance is shorter than the second margin distance.

3. The parking control method according to claim 1, wherein
the parking route to be calculated includes a position of turn for parking,
the first proximity level is represented by a first turning distance between a first position of turn belonging to the first area and the obstacle,
the second proximity level is represented by a second turning distance between a second position of turn belonging to the second area and the obstacle, and
the parking route is calculated such that the first turning distance is shorter than the second turning distance.

4. The parking control method according to claim 1, wherein
the first proximity level is represented by a first separation distance from the obstacle to the parking route,
the second proximity level is represented by a second separation distance from the obstacle to the parking route, and
the parking route is calculated such that the first separation distance is shorter than the second separation distance.

5. The parking control method according to claim 1, wherein
the control instruction includes deceleration start timing at which deceleration control is started,
the first proximity level is represented by first deceleration start timing at which deceleration is started when approaching the obstacle,
the second proximity level is represented by second deceleration start timing at which deceleration is started when approaching the obstacle, and
the control instruction is generated such that the first deceleration start timing is later timing than the second deceleration start timing.

6. The parking control method according to claim 1, wherein
the control instruction includes a deceleration completion distance between a deceleration completion point at which deceleration control is completed and the obstacle,
the first proximity level is represented by a first deceleration completion distance from the obstacle to a first deceleration completion point in the first area,
the second proximity level is represented by a second deceleration completion distance from the obstacle to a second deceleration completion point in the second area, and
the control instruction is generated such that the first deceleration completion distance is shorter than the second deceleration completion distance.

7. The parking control method according to claim 1, wherein
the control instruction includes deceleration,
the first proximity level is represented by first deceleration when approaching the obstacle,
the second proximity level is represented by second deceleration when approaching the obstacle, and
the control instruction is generated such that the first deceleration is higher than the second deceleration.

8. The parking control method according to claim 1, wherein
the control instruction includes relative speed limit values of the vehicle to the operator,
the relative speed limit values include a first relative speed limit value between the vehicle belonging to the first area and the operator,
the relative speed limit values include a second relative speed limit value between the vehicle belonging to the second area and the operator, and
the control instruction is generated such that the first relative speed limit value is higher than the second relative speed limit value.

9. The parking control method according to claim 1, wherein the parking route is calculated such that at least a part of the vehicle exists in the first area along at least a part of the parking route of the vehicle.

10. The parking control method according to claim 9, wherein the parking route is calculated such that at least a part of the vehicle exists in the first area when located at a position of turn for parking that is included in the parking route.

11. The parking control method according to claim 9, wherein the parking route is calculated such that a specific portion of the vehicle exists in the first area.

12. The parking control method according to claim 11, wherein the specific portion is preliminarily set in accordance with a parking form of the vehicle.

13. The parking control method according to claim 9, wherein the parking route is calculated such that at least a part of the vehicle exists in the first area when a distance between the vehicle and the obstacle is less than a predetermined value.

14. The parking control method according to claim 9, wherein when an angle between a direction of the vehicle with reference to the position of the operator and a direction of at least a part of the parking route is less than a predetermined angle, the parking route is changed.

15. The parking control method according to claim 9, wherein
the second area other than the first area and unobservable from the operator is calculated, and
when at least a part of the parking route of the vehicle belongs to the second area, the parking route is calculated such that at least a part of the vehicle exists in the first area.

16. The parking control method according to claim 15, wherein a second target speed on the parking route belonging to the second area is set lower than a first target speed on the parking route belonging to the first area.

17. The parking control method according to claim 15, wherein when an area of the second area unobservable from a first observation position that is set on a basis of the position of the operator is larger than an area of the second area unobservable from a second observation position different from the first observation position, the second observation position is transmitted to an operation terminal carried by the operator.

18. A parking control apparatus comprising a control device configured to execute a control instruction for parking a vehicle on a basis of an operation command acquired from an operator outside the vehicle, the control device being further configured to:
detect a position of the operator;
detect a position of an obstacle existing around the vehicle;
calculate a first area observable from the operator and a second area other than the first area and unobservable from the operator on a basis of a positional relationship between the position of the obstacle and the position of the operator;
calculate a parking route and the control instruction for moving along the parking route such that a first proximity level of the vehicle to the obstacle in the first area is higher than a second proximity level of the vehicle to the obstacle in the second area; and
park the vehicle in accordance with the control instruction.

* * * * *